(12) United States Patent
Strobel

(10) Patent No.: US 11,524,798 B2
(45) Date of Patent: Dec. 13, 2022

(54) DUCTED FAN UNMANNED AERIAL VEHICLE DOCKING STATION

(71) Applicant: Armin Strobel, Newfoundland and Labrador (CA)

(72) Inventor: Armin Strobel, Newfoundland and Labrador (CA)

(*) Notice: Subject to any disclaimer, the term of this patent is extended or adjusted under 35 U.S.C. 154(b) by 957 days.

(21) Appl. No.: 16/329,833

(22) PCT Filed: Aug. 29, 2017

(86) PCT No.: PCT/CA2017/051012
§ 371 (c)(1),
(2) Date: Mar. 1, 2019

(87) PCT Pub. No.: WO2018/039784
PCT Pub. Date: Mar. 8, 2018

(65) Prior Publication Data
US 2019/0241282 A1 Aug. 8, 2019

Related U.S. Application Data

(60) Provisional application No. 62/382,714, filed on Sep. 1, 2016.

(51) Int. Cl.
*B64F 1/22* (2006.01)
*B64C 39/02* (2006.01)
(Continued)

(52) U.S. Cl.
CPC ............ *B64F 1/222* (2013.01); *B64C 39/024* (2013.01); *B64C 39/062* (2013.01);
(Continued)

(58) Field of Classification Search
CPC .... B64F 1/222; B64F 1/362; B64C 2201/201; B64C 2201/18; B64C 2201/206; B64C 2201/182
See application file for complete search history.

(56) References Cited

U.S. PATENT DOCUMENTS 8,511,606 B1 * 8/2013 Lutke .................... B64C 39/024
320/109
9,718,564 B1 * 8/2017 Beckman ................ B61L 23/00
(Continued)

FOREIGN PATENT DOCUMENTS

AU 2020258267 A1 * 9/2021 ............ B64C 25/06
CN 114013674 A * 2/2022
(Continued)

OTHER PUBLICATIONS

International Search Report and Written Opinion for corresponding international application No. PCT/CA2017/051012, dated Nov. 28, 2017.

*Primary Examiner* — Philip J Bonzell
(74) *Attorney, Agent, or Firm* — Tarolli, Sundheim, Covell & Tummino LLP

(57) ABSTRACT

A ducted fan unmanned aerial vehicle (UAV) docking station is provided. The docking station comprises: a guide sized to receive a ducted fan UAV; and a housing communicatively coupled to the guide. The housing comprises: a storage assembly comprising: at least one compartment sized to store the UAV; and at least one dampening system coupled to the at least one storage compartment for cushioning the UAV.

16 Claims, 18 Drawing Sheets

(51) Int. Cl.
 *B64C 39/06* (2006.01)
 *B64D 37/00* (2006.01)
 *B64F 1/36* (2017.01)

(52) U.S. Cl.
 CPC ............ *B64D 37/005* (2013.01); *B64F 1/362* (2013.01); *B64C 2201/145* (2013.01); *B64C 2201/18* (2013.01); *B64C 2201/201* (2013.01)

(56) References Cited

U.S. PATENT DOCUMENTS

| | | |
|---|---|---|
| 9,764,836 B1 * | 9/2017 | Elzinga ................. B64C 39/024 |
| 9,950,814 B1 * | 4/2018 | Beckman ................. B61L 23/04 |
| 2004/0256519 A1 | 12/2004 | Ellis et al. |
| 2014/0032034 A1 | 1/2014 | Raptopoulos et al. |
| 2016/0001883 A1 | 1/2016 | Sanz et al. |
| 2016/0068264 A1 | 3/2016 | Ganesh et al. |
| 2016/0116601 A1 | 4/2016 | Horn et al. |

FOREIGN PATENT DOCUMENTS

| | | | |
|---|---|---|---|
| DE | 202015007318 U1 | 11/2015 | |
| FR | 3052441 A1 * | 12/2017 | ........... B64C 39/024 |
| JP | 2018192932 A * | 12/2018 | |
| KR | 101621144 B1 * | 5/2016 | |
| WO | 2016059555 A1 | 4/2016 | |
| WO | 2016125142 A1 | 8/2016 | |
| WO | WO-2016130112 A1 * | 8/2016 | |

* cited by examiner

DUCTED FAN UNMANNED AERIAL VEHICLE DOCKING STATION

RELATED APPLICATIONS

The present invention is a U.S. National Stage under 35 USC 371 patent application, claiming priority to Serial No. PCT/CA2017/051012, filed on Aug. 29, 2017; which claims priority of U.S. 62/382,714, filed on Sep. 1, 2016, the entirety of both of which are incorporated herein by reference.

FIELD

The subject application relates generally to ducted fan unmanned aerial vehicles (UAV) and in particular, to a docking station for ducted fan UAVs.

BACKGROUND

Unmanned aerial vehicles (UAVs) or autonomous drones are rapidly increasing in functionality and affordability. They are becoming ubiquitous in a wide variety of industries, such as: supply chain/warehouse management, agriculture, transportation, oil and gas, and infrastructure. One such type of UAV is a vertical take-off and landing (VTOL) ducted fan UAV.

A ducted fan UAV comprises a duct surrounding a fuselage which supports a fan or propeller within the duct and control surfaces or vanes. The UAV may further comprise stators that interact with the fan to stabilize the airflow of the fan. The fan is configured to rotate to produce lift. The lift generated by the fan is controlled to alter the altitude of the UAV during flight. Control surfaces on the UAV control thrust vectoring to control the orientation of the UAV during flight.

A landing pad may be used to deploy and recover the ducted fan UAV. The landing pad may have a connection to permit recharge and/or refueling of the ducted fan UAV. Some landing pads require human interaction to manually connect the UAV to the recharging/refueling station. This requires individuals to be present at the take-off and landing-sites which may be in dangerous or hazardous locations. Furthermore, the personnel needed to facility the connection to the recharging/refueling station require payment and transportation to the sites increasing costs and introducing the potential for delays.

Alternative landing pads exist with built-in charging pads. These landing pads require extremely precise landings, on the order of 10 to 20 cm, in order to align with contacts on the charging pads. Precise landing can be extremely difficult in certain environmental conditions, for example, high wind conditions. Furthermore, in high wind conditions, the UAV can tip over since the landing pad is open to the environment.

Loading and unloading of the UAV payload requires human interaction. This requires individuals to be present at the take-off and landing-sites which may in dangerous or hazardous locations. Furthermore, the personnel needed to load and unload the UAV require payment and transportation to the sites increasing costs and introducing the potential for delays.

Furthermore, landing pads generally only provide for refueling, recharging, loading and unloading of a single UAV.

It is therefore an object to at least partially mitigate the disadvantages identified.

SUMMARY

Accordingly, in one aspect there is provided a ducted fan unmanned aerial vehicle (UAV) docking station comprising: a guide sized to receive a ducted fan UAV; and a housing communicatively coupled to the guide, the housing comprising: a storage assembly comprising: at least one compartment sized to store the UAV; and at least one dampening system coupled to the at least one storage compartment for cushioning the UAV.

In one embodiment, the docking station further comprises a communication system configured to communicate with the ducted fan UAV.

In another embodiment, the communication system is further configured to communicate with an operator of the UAV.

In another embodiment, the communication system further comprises a global navigation satellite system (GNSS) receiver with real time kinematic (RTK) base station capability.

In another embodiment, the GNSS receiver provides RTK correction data.

In another embodiment, the housing further comprises a charging system configured to charge the UAV.

In another embodiment, the housing further comprises a fueling system configured to fuel the UAV.

In another embodiment, the dampening system comprises a plate sized to support the UAV and a plurality of arms supporting the plate.

In another embodiment, the storage assembly comprises three adjacent compartments. In another embodiment, the storage assembly comprises two dampening systems, each dampening system located within a respective compartment.

In another embodiment, the storage assembly is revolvable such that each compartment can be accessed via the guide during revolution of the storage assembly. In another embodiment, the housing further comprises a motor for revolving the storage assembly.

In another embodiment, the compartment comprises a cylinder.

In another embodiment, the docking station further comprises a lid coupled at least one compartment for covering the at least one compartment.

In another embodiment, the storage assembly further comprises an infrared light beacon for guiding the UAV through the guide and into the compartment.

In another embodiment, the guide comprises a rim supported by a plurality of rigid wires extending between the rim and the housing.

In another embodiment, the guide comprises: a rim supported by a plurality of posts; and flexible wires extending the rim and the housing.

According to another aspect there is provided an unmanned aerial vehicle (UAV) comprising: a fuselage; a duct comprising a rotatable fan or propeller configured to provide lift to the UAV, wherein the duct is connected to the fuselage; and two rotatably mounted opposed canards extending from the fuselage, wherein the canards are configured to rotate and alter an angle of attack of the canards during flight of the UAV.

In one embodiment, the duct is generally cylindrical.

In another embodiment, each canard is configured to rotate to alter an angle of attack of the respective canard.

In another embodiment, each canard is configured to rotate to an angle of rotation, where the angle of rotation ranges from −60° to +10° relative to a central longitudinal axis of the UAV.

In another embodiment, the UAV is a ducted fan UAV.

In another embodiment, the duct further comprises a plurality of guide vanes, each guide vane comprises a control vane configured to control thrust and lift vectors of the UAV. In another embodiment, the control vanes are configured to cause attitude changes of the UAV during flight. In another embodiment, the attitude changes comprise at least one of pitching, rolling and yawing of the UAV during flight. In another embodiment, the control vanes are configured to cause transition of the UAV between a vertical orientation and a horizontal orientation during flight.

In another embodiment, rotation of the canards is configured to reduce drag and/or increase lift of the UAV during flight. In another embodiment, rotation of the canards is configured to prevent stalling of the UAV during transition and flight.

In another embodiment, the span from one canard to another canard is less than the diameter of the duct.

BRIEF DESCRIPTION OF THE DRAWINGS

Embodiments will now be described more fully with reference to the accompanying drawings in which.

DETAILED DESCRIPTION OF EMBODIMENTS

Figure 1:
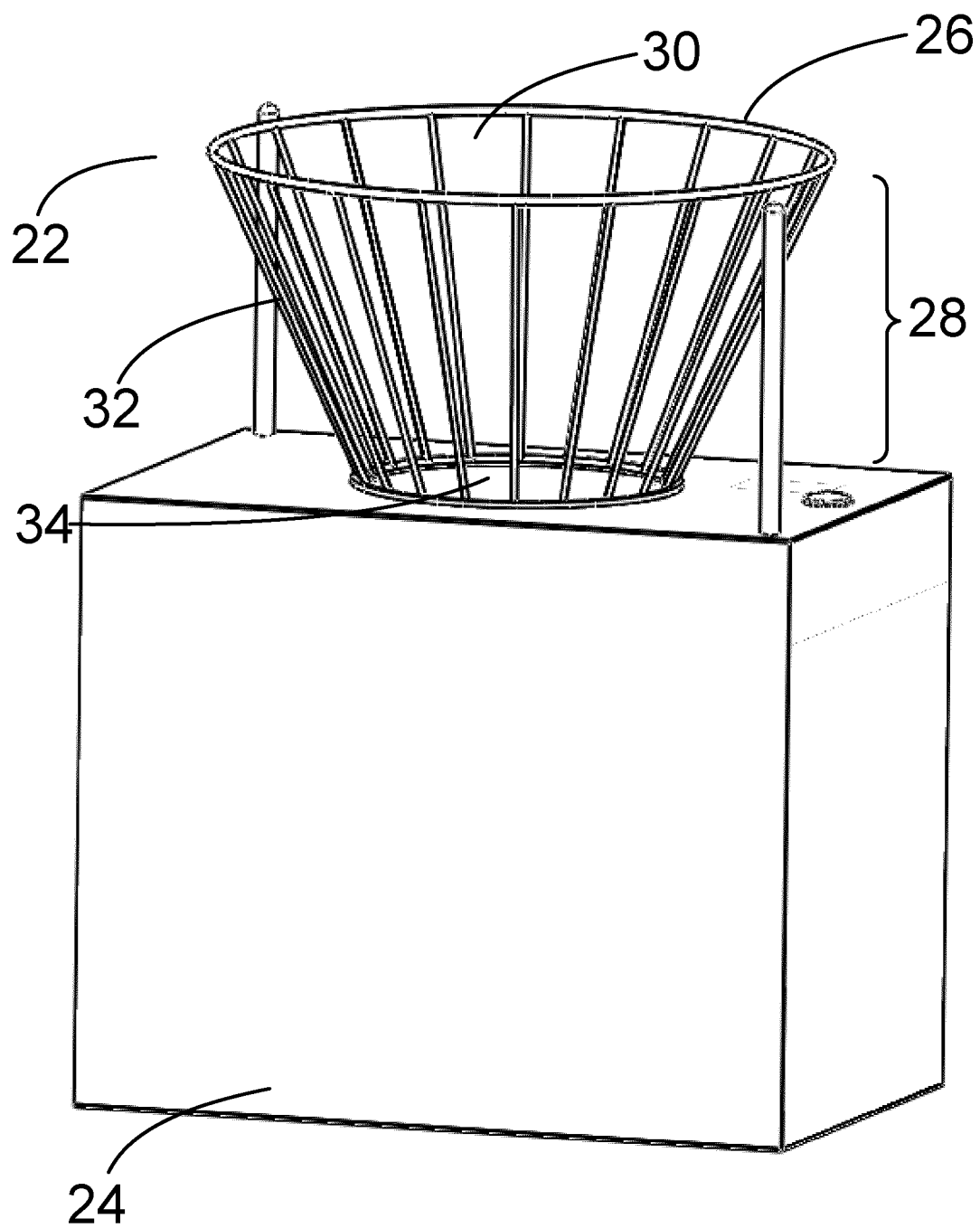
FIG. 1 is a perspective view of a docking station in accordance with an aspect of the disclosure.

Turning now to FIG. 1, a docking station is shown and is generally identified by reference numeral 20. The docking station 20 comprises a guide 22 sized to receive a ducted fan UAV as will be described, a housing 24 communicatively coupled to the guide 22 and a communication system.

The guide 22 is configured to safely and reliably guide a ducted fan UAV into the housing 24. The guide 22 is coupled to the housing 24 such that a ducted fan UAV descends through the guide 22 into the housing 24. The guide 22 comprises a rim 26 coupled to a body 28 which is coupled to the housing 24. The rim 26 forms a main opening 30 which is sized to receive a ducted fan UAV. The body 28 between the rim 26 and the housing 24. The body 28 comprises wires 32 extending between the housing 24 and the rim 26. The housing 24 is accessible from the guide 22 via a secondary opening 34. The wires 32 extend diagonally from the housing 24 such that the main opening 30 is larger than the secondary opening 34. The rim 26 is sized such that the main opening 30 is larger than the diameter of a ducted fan UAV. The rim 26 is approximately five times larger than the diameter of a diameter of a duct of the ducted fan UAV. While a particular rim 26 size has been described, those of skill in the art will appreciate that other dimensions are possible.

The secondary opening 34 is marginally larger than the diameter of a ducted fan UAV. The wires 32 are rigid. The wires 32 are stiff. The wires 32 are stiff enough such that a UAV may not get stuck or fall through a gap between adjacent wires 32. The wires 32 support the rim 26. The spacing between the wires 26 allows for air to blow between the wires 28. This reduces the disturbance on a UAV during landing and take-off caused by wind. In particular, this reduces the disturbance caused by the air stream from a UAV especially during landing of the UAV (ground effect) as will be described. The rim 26 is ring-shaped. The rim 26 has a generally circular shape. The angle of the wires 32 relative the housing 24 of the docking station 20 ensures that if a UAV contacts the wires 32, the UAV does not get stuck on the wires 32, but rather descends through the secondary opening 34 as will be described. The angle of the wires 32 is approximately 15° from the longitudinal central axis. While a particular angle of the wires 32 has been described, those of skill in the art will appreciate that other angles are possible.

Figure 2:
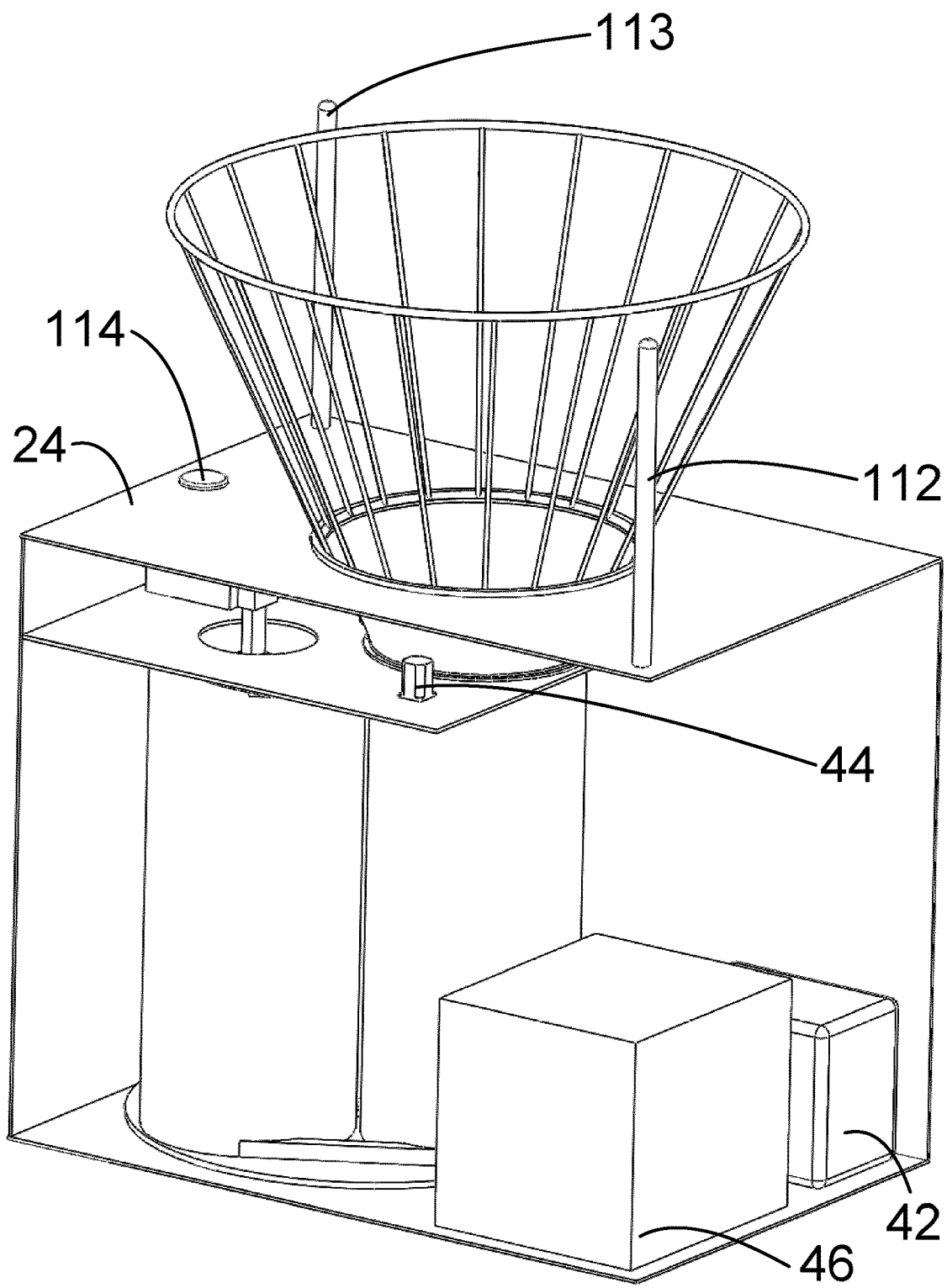
FIG. 2 is a perspective view of the docking station of FIG. 1 with external walls of the housing removed.
Figure 3:
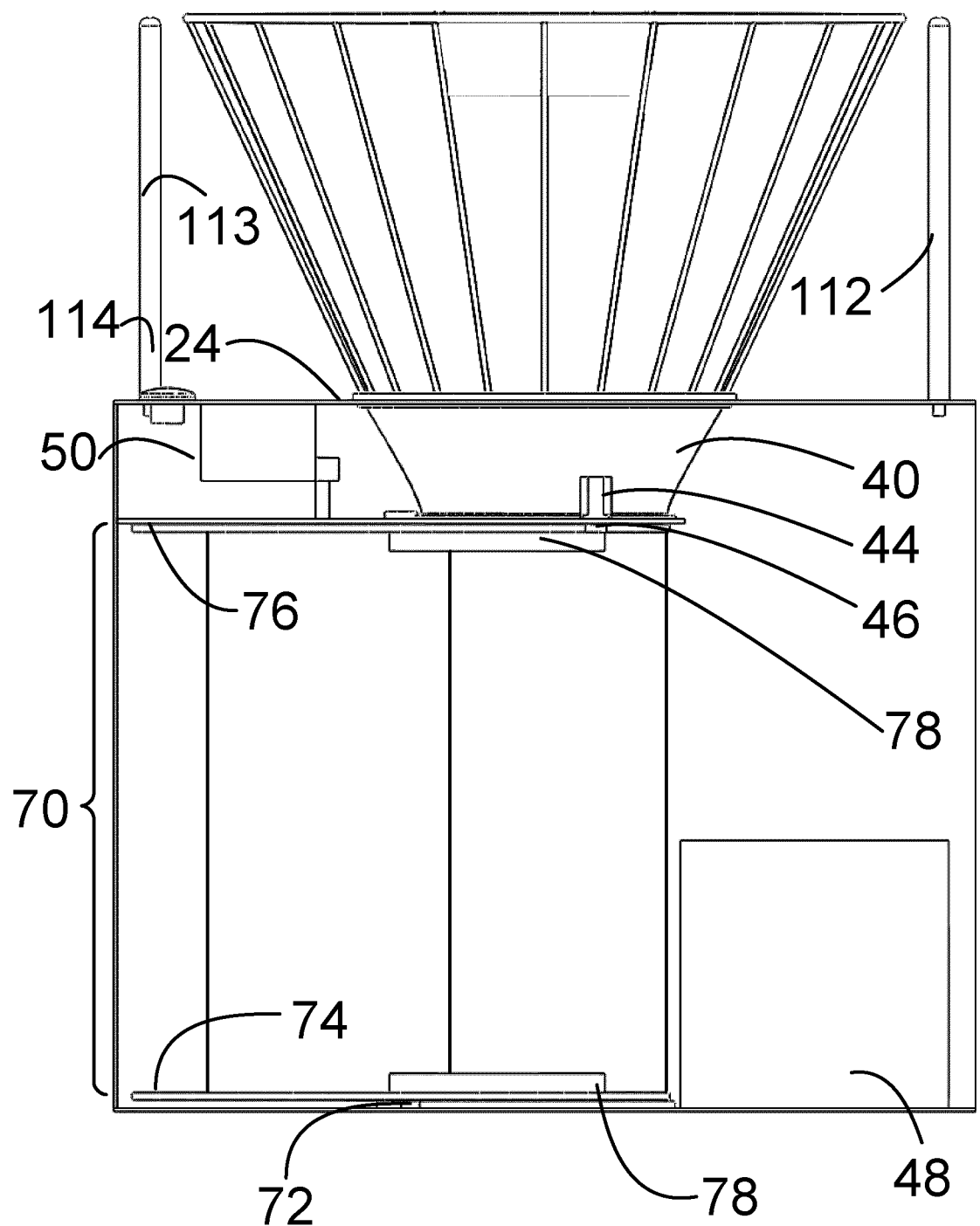
FIG. 3 is a side elevation view of the docking station of FIG. 1 with an external wall of the housing removed.

Turning now to FIGS. 2 and 3, the docking station 20 is shown with walls of the housing 24 removed. The housing 24 is a structure. The housing 24 is a rectangular parallelepiped. The housing 24 comprises a frustum 40, a charging system, 42, a motor 44, a control system 48, a payload system 50 and a storage assembly 70. The frustum 40 is hollow. The frustum 40 is cylindrical. The frustum 40 is communicatively coupled to the guide 22 such that a ducted fan UAV may pass from within the guide 22 into the frustum 40 via the secondary opening 34. The frustum 40 is communicatively coupled to the storage assembly 70 as will be described. The housing 24 has a top opening aligned and adjacent with the secondary opening 34 of the guide 22 and the larger opening of the frustum 40. The housing 24 has a bottom opening that is aligned with the smaller opening of the frustum 40. The bottom opening is a bottom panel of the housing 24.

The charging system 42 is configured to charge a ducted fan UAV once the UAV is docked and stored within the storage assembly 70. The charging system 42 provides electrical power to the docked and stored UAV within the storage assembly 70. The charging system 42 provides electrical power via wireless power transfer. The motor 44 is mounted to the storage assembly 70. The motor 44 has a rotor 46. The motor 44 is configured to rotate the storage assembly 70 via the rotor 46 as will be described.

The payload system 50 is configured to remove an existing payload from a ducted fan UAV that is docked and stored within the storage assembly 70. The payload system 50 is also configured to connect a new payload to the ducked fan UAV that is docked and stored within the storage assembly 70 once an existing payload is removed. The payload system 50 is shown in more detail in FIG. 4. The payload system 50 comprises a control unit 52, an arm 54 and a gripper 56. The control unit 52 controls extension/retraction of the arm 54. The arm 54 is connected to the control unit 52 at one end and to the gripper 56 at the other end. The gripper 56 is configured to affix to a payload and either load a new payload onto a UAV or unload an existing payload from a UAV. The gripper 56 is a suction cup sized to affix to a payload. Extension and retraction of the arm 54 moves the gripper 56 toward or away from, respectively, a ducted fan UAV within a compartment 90 aligned with the gripper 56 to load or unload a payload from the UAV.

The storage assembly 70 comprises a mount 72 upon which a first end plate 74 is rotatably mounted at a location generally central to the first end plate 74. Three compartments 90 are affixed to the first end plate 74. The compartments 90 are generally equidistant on the first end plate 74. The compartments 90 are held in place laterally by three arms 78. Each arm 78 extends from one of the compartments 90 to another of the compartments 90. Each compartment 90 is sized to receive and store a ducted fan UAV. The compartments 90 are hollow cylinders. Each compartment 90 has an open end that is sized such that a ducted fan UAV can pass through the opening of the compartment.

In this embodiment, the storage assembly 70 further comprises a lid (not shown) to protect the contents within the compartment 90. The lid is positioned between the frustum 40 and the second end plate 76. The lid is movable between an open and a closed position. In the open position, the lid allows access to a respective compartment 90. In the closed position, ingress into or egress from the respective compartment 90 is not possible.

The compartments 90 are affixed at one longitudinal end to the first end plate 74 and at the other longitudinal end to the second end plate 76. The first and second end plates 74 and 76, respectively, have three apertures aligned and similarly sized with the openings of the compartments 90. The rotor 46 of the motor 44 is in contact with the second end plate 76. Rotation of the rotor 46 of the motor 44 causes rotation of the storage assembly 70.

The frustum 40 is communicatively coupled to an opening in the housing 24 such that a ducted fan UAV may pass from the guide 22 through the secondary opening 34 and into the frustum 40. As the storage assembly 70 rotates the open end of one of the compartments 90 is aligned with the smaller open end of the frustum 40 and the opening in the housing 24 to allow for ingress into or egress from the compartment 90.

The first end plate 74 and the second end plate 76 are generally circular. The first end plate 74 and the second end plate 76 are similarly sized and shaped. As previously stated, each compartment 90 is a hollow cylinder having open ends.

Figure 4:
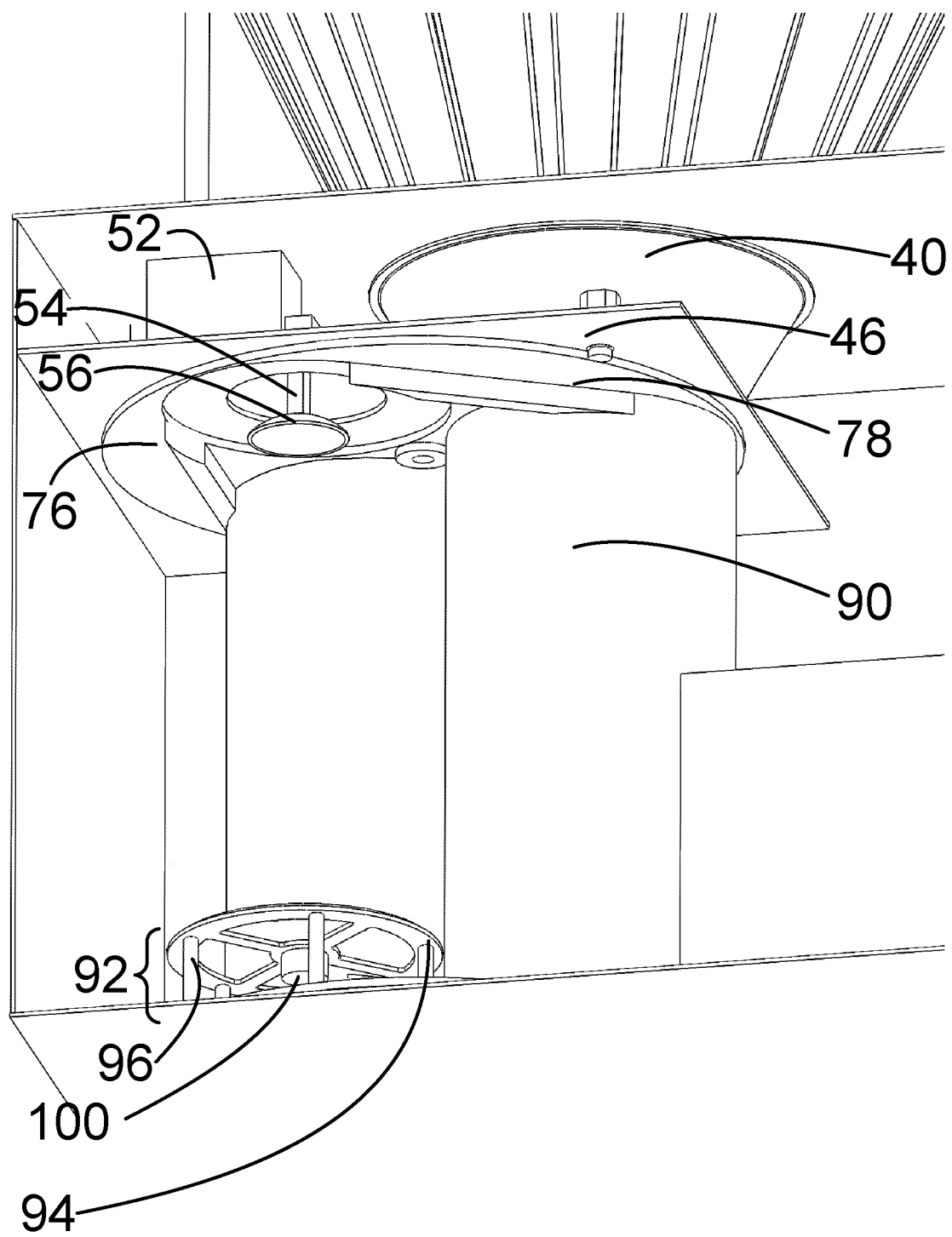
FIG. 4 is a partial perspective view of the docking station of FIG. 1 with an external wall of the storage assembly removed.
Figure 5:
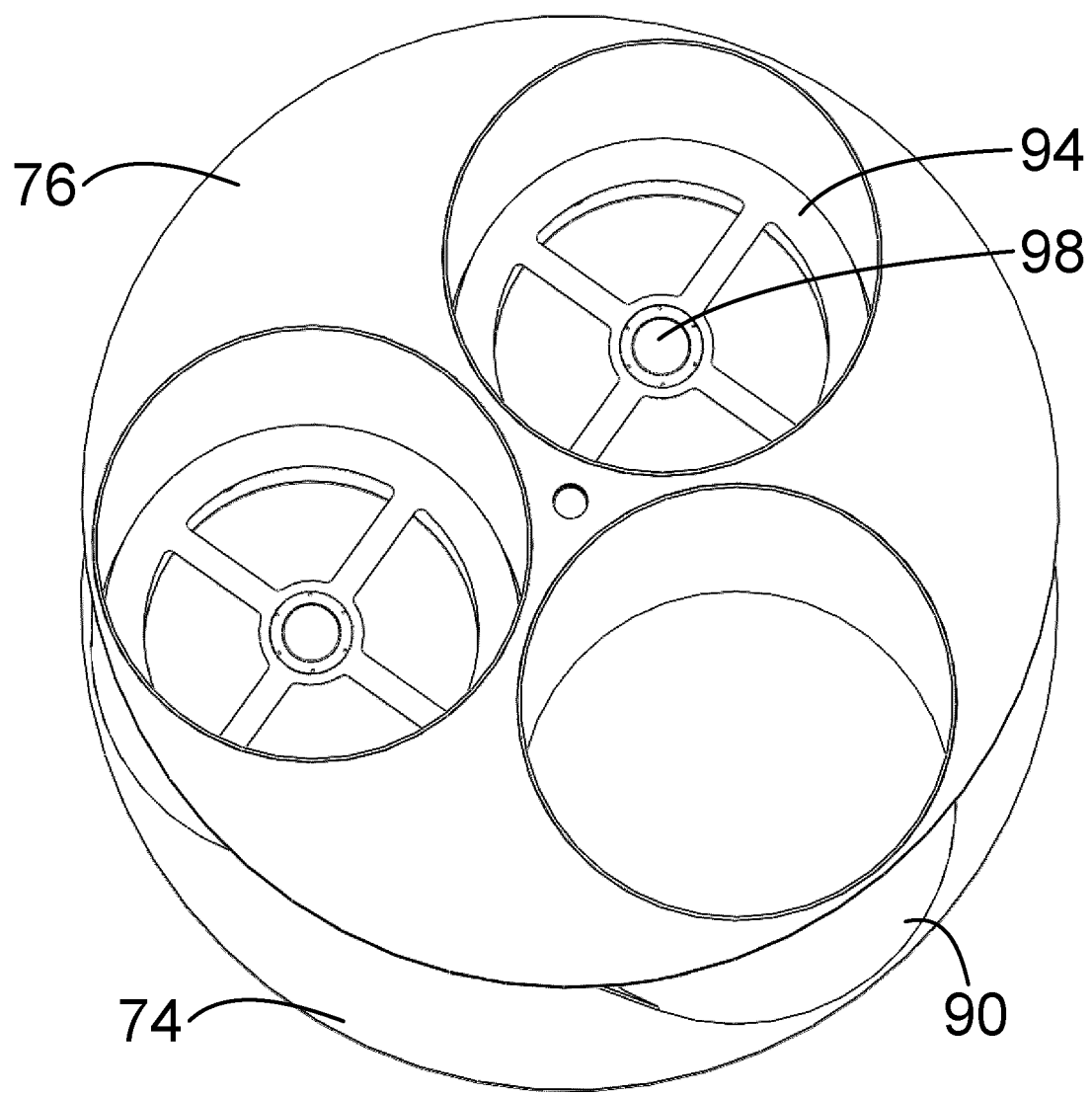
FIG. 5 is a perspective view of components of the storage assembly of the docking station of FIG. 1.

As shown in FIGS. 4 and 5, two of the three compartments 90 comprise a dampening system 92. Each dampening system 92 is mounted within the respective compartment 90. The dampening system 92 is mounted at one end of the compartment 90. The dampening system 90 is located within the compartment 90 proximate the first end plate 74. The dampening system 90 is configured to receive a ducted fan UAV safely to avoid damage to the UAV when landing within the compartment 90. The dampening system 92 comprises a landing plate 94 mounted on four posts 96 and an infrared (IR) light beacon 100. The landing plate 94 is generally circular with an outer disc circumscribing an X pattern having an aperture 98. The aperture 98 is generally central within the landing plate 94. The posts 96 support the landing plate 94 within the compartment 90. The posts 96 permit movement of the landing plate 94 relative to the first end plate 74 within the compartment 90. The posts 96 comprise dampening material.

The IR light beacon 100 is mounted to the landing plate 94. The IR light beacon 100 emits IR light that allows for precision guidance of a ducted fan UAV into the compartment 90 as will be described. The IR light beacon 100 is mounted on the landing plate 94 such that the IR light generated by the IR light beacon 100 passes through the aperture 98 in the landing plate 94.

As previously stated, one of the compartments 90 does not comprise a dampening system 90. The compartment 90 that does not comprise a dampening system 90 is referred to as the empty compartment. The empty compartment is utilized to prevent damage to UAVs that are stored within the other two compartments 90 as will be described.

The communication system comprises a first antenna 112, a second antenna 113 and a global navigation satellite system (GNSS) receiver 114. The first antenna 112 is used to communicate with an operator of a UAV. The first antenna 112 is used to communicate with the operator of a UAV via LTE, Wifi, Iridium, etc. The second antenna 113 is used to communicate with a UAV. The GNSS receiver 114 has real time kinematic (RTK) base station capability. The GNSS receiver 114 is configured to transmit RTK correction data to the UAV via the second antenna 113. The UAV is uses the RTK correction data to correct the position information of a GNSS receiver onboard the UAV. This allows the UAV to obtain more precise location data than conventional GNSS receiver data.

The control system 48 is configured to control the motor 44 to control rotation of the storage assembly 70. The control system 48 is configured to control the payload assembly 50 to control loading and unloading of payloads to and from ducted fan UAVs within the storage assembly 70. The control system 48 is configured to control the IR light beacon 100 of the dampening system 92 to assist in precision guidance of a UAV. The control system 48 is configured to control charging of at least one UAV stored in at least one compartment 90 via the charging system 42. The control system 48 is configured to control communication with a UAV via the communication system. The control system 48 is configured to control communication with an operator of a UAV via the communication system.

Figure 6A:
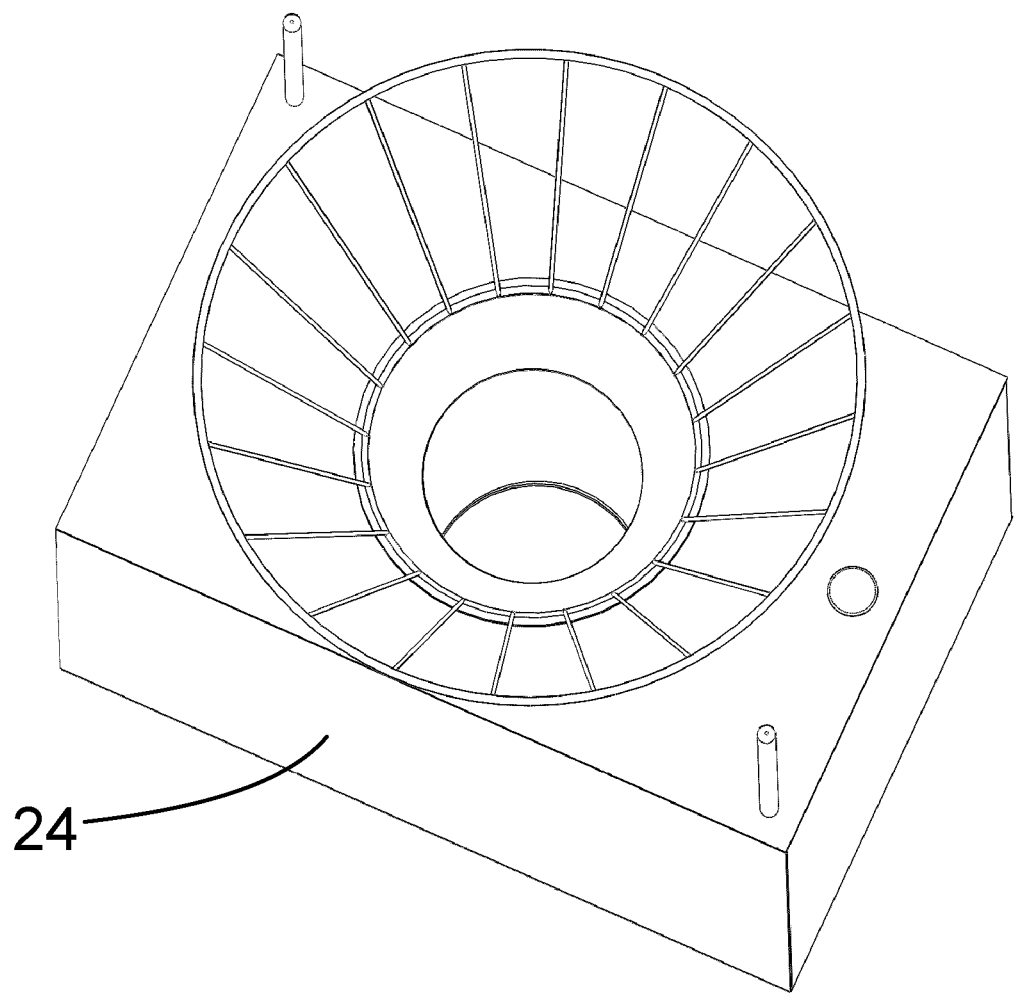
FIG. 6a is a perspective view of the docking station of FIG. 1 with the empty compartment accessible via the guide.
Figure 6B:
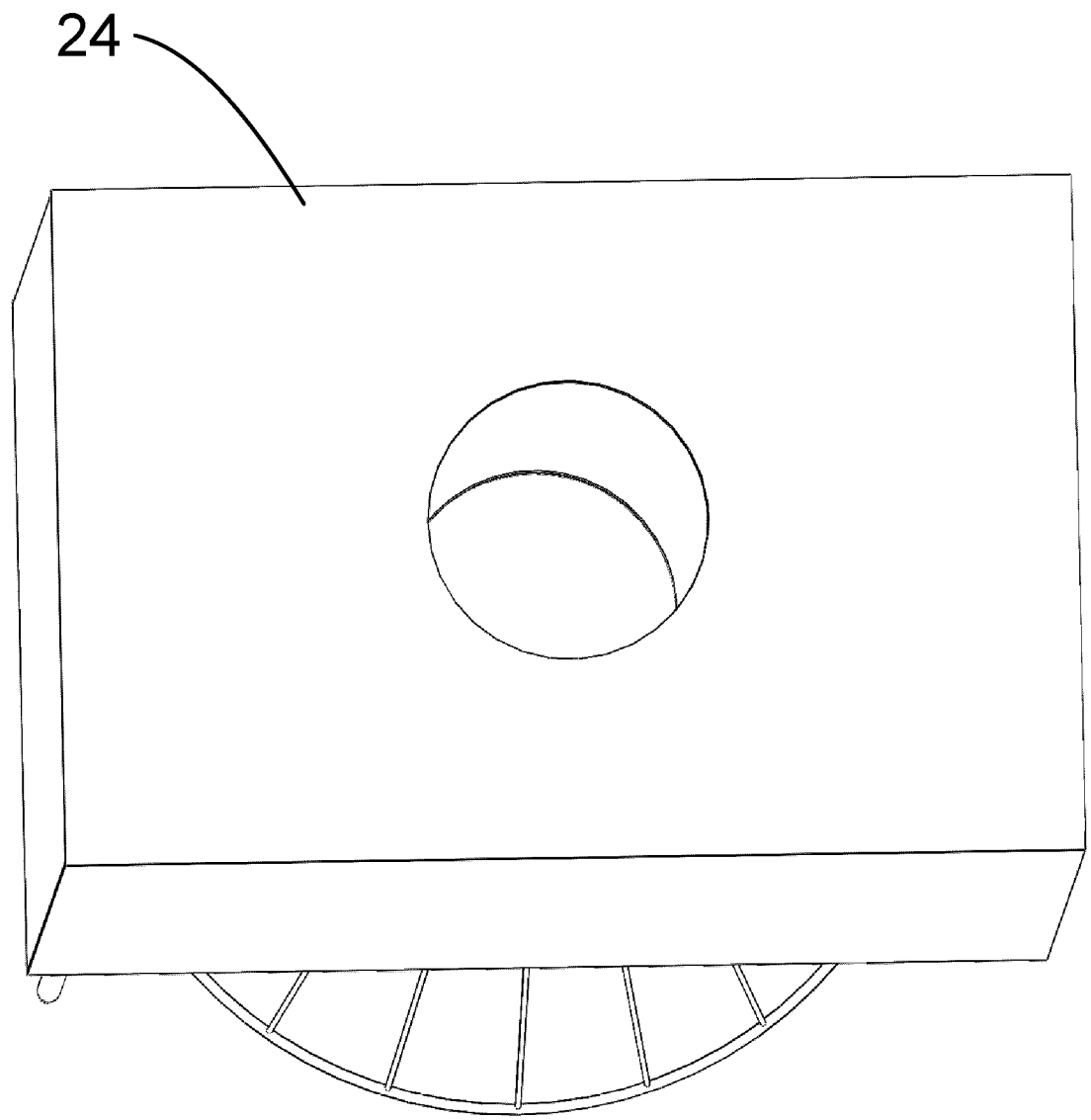
FIG. 6b is another perspective view of the docking station of FIG. 1 with the empty compartment accessible via the guide.

In operation, prior to a UAV 120 approaching the docking station 20, the empty compartment of the storage assembly 70 is positioned in alignment with the secondary opening 34 of the guide 22 as shown in FIGS. 6a and 6b. In this orientation, the empty compartment is aligned with the secondary opening 34 as well as with the top and bottom openings of the housing 24.

In this configuration, any UAVs that are stored in the compartments 90 of the storage assembly 70 are inaccessible. This is particularly beneficial when weather conditions may damage UAVs that may be stored in the storage assembly 70. For example, if the docking station 20 is an environment with potential rain or snowfall, any precipitation will fall into the empty compartment and descend out of the bottom opening of the housing 24 without affecting the UAVs stored in other compartments 90 of the storage assembly 70.

Figure 7:
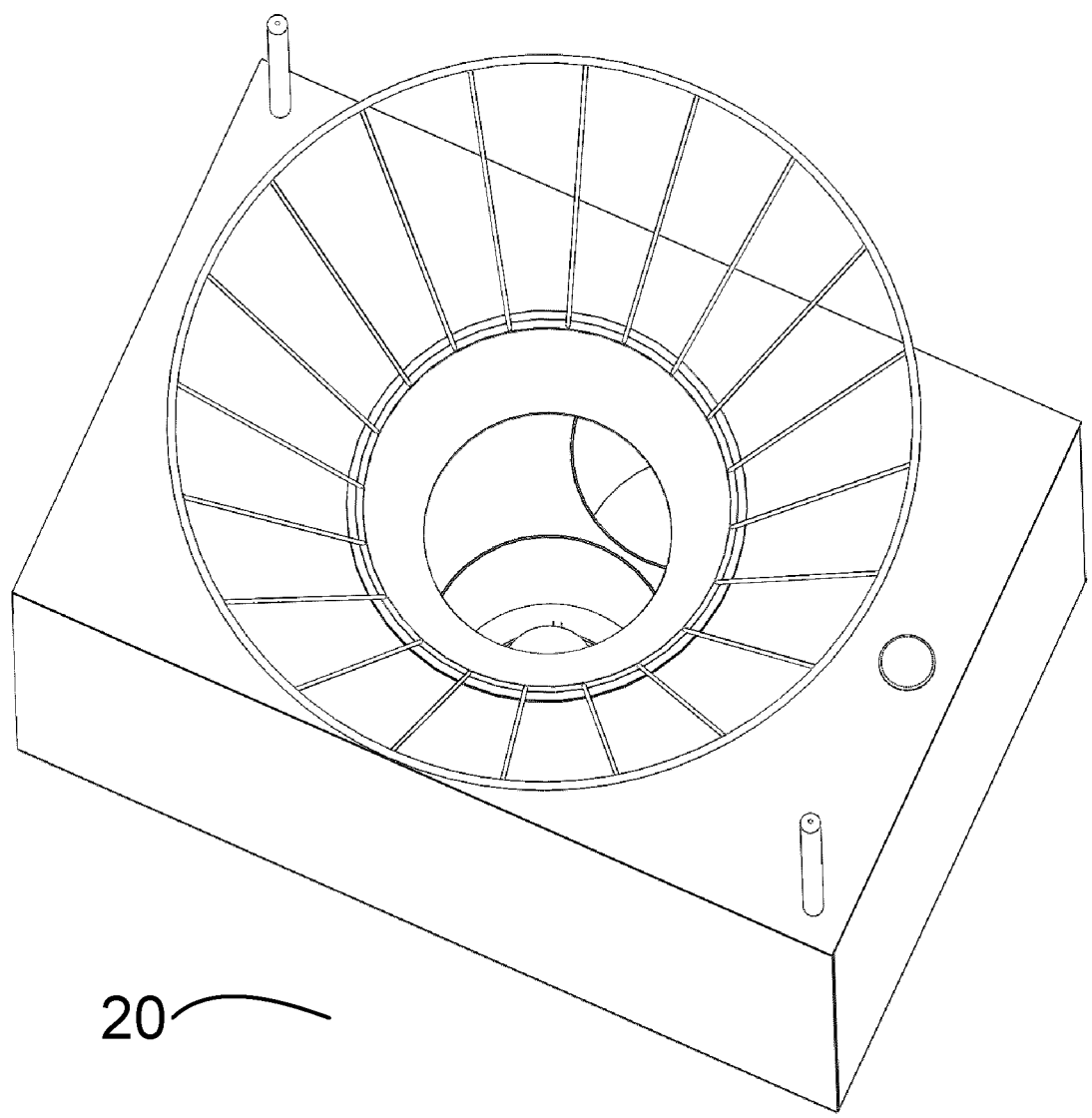
FIG. 7 is a perspective view of the docking station of FIG. 1 during rotation of the storage assembly.

The communication system is configured to broadcast the position of the docking station 20 and the RTK correction data from the GNSS receiver 114 via the antenna 113 to the UAV 120. Once the UAV 120 attains a particular proximity to the docking station 20, the control system 48 activates the motor 44 to rotate the storage assembly 70 by rotating the second end plate 76 via the rotor 46. As shown in FIG. 7, the storage assembly 70 rotates until one of the compartments 90 that comprises a dampening system 92, but is not storing a UAV is in alignment with secondary opening 34 of the guide 22.

The control system 48 then activates the IR light beacon 100 of the dampening system 92 in the compartment 90 that is in alignment with the secondary opening 34 of the guide 22. The UAV 120 is equipped with a GNSS receiver that is configured to receive navigational data. The UAV 120 guides itself into the respective compartment 90 by using the navigational data received by the GNSS receiver on the UAV 120 with the RTK correction data supplied by the communication system of the docking station 20. In this embodiment, the UAV 120 is also equipped with an IR light sensitive camera. The UAV 120 may also use the IR light beacon 100 to guide itself via the IR light sensitive camera.

Figure 8:
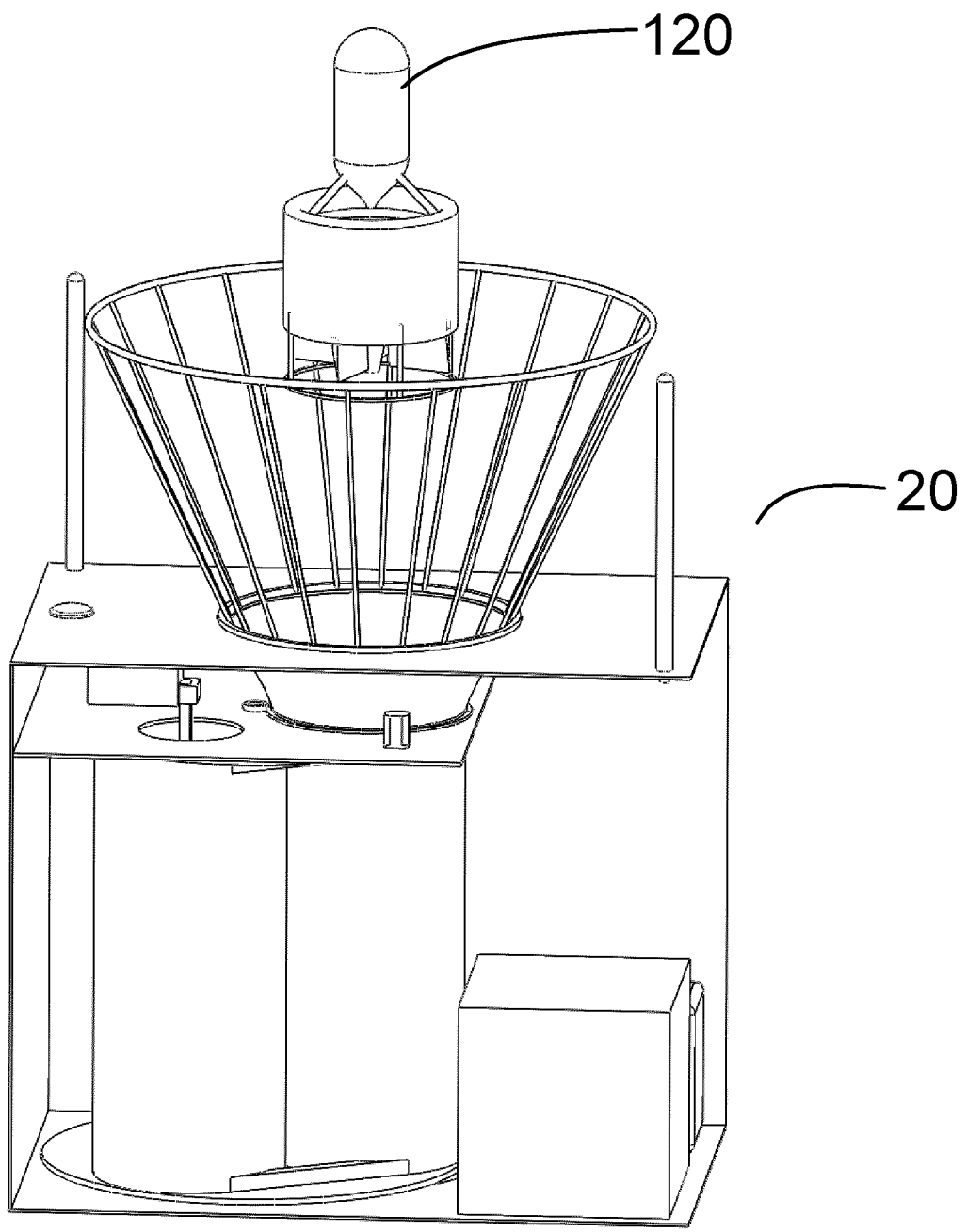
FIG. 8 is a perspective view of the docking station of FIG. 1 with external walls of the housing removed and a UAV.

The UAV 120 descends through the main opening 30 of the guide 22 as shown in FIG. 8. The UAV 120 may contact the wires 32 of the body 28 of the guide 22. As previously stated, the wires 32 are stiff. If the UAV 120 contacts the wires 32, the angles of the wires 32 to the housing 44 are such that the UAV 120 will not fall over and/or stay on the wires 32, but rather the UAV 120 will descend through the secondary opening 34 of the guide 22.

As the UAV 120 descends down through the main opening 30 of the guide 22, the UAV 120 enters a critical phase in the last meter of the decent to land where the ground effect and wind disturbances are strongest. In this critical phase, the UAV 120 is within the guide 22. As the UAV 120 enters the main opening 30 of the guide 22, the ground effect and wind disturbance are reduced due to the wires 32. As the UAV 120 descends through the guide 22 towards the secondary opening 34 of the guide 22, the ground effect and wind disturbance get stronger due to the proximity to the surface, but the wires 32 of the guide 22 ensure a safe and reliable descent into a compartment 90 by reducing the ground effect and wind disturbance.

The UAV 120 continues its descent into one of the compartments 90 of the storage assembly 70 that comprises a dampening system 92 via the frustum 40. The UAV 120 descends into a compartment 90 and contacts the landing plate 94 of the dampening system 92. The UAV 120 disengages its propulsion system when a landing is detected. Landing is detected when the UAV 120 is no longer descending. As the UAV 120 rests on the landing plate 94, the posts 96 compress to position the UAV 120 such that the UAV 120 can be charged via the charging system 42. The control system 48 then activates the charging system 42 to charge the UAV 120 via wireless power transfer.

The control system 48 may active the motor 44 to rotate the storage assembly 80 by rotating the second end plate 76 via the rotor 46 and rotate move the compartment 90 containing a stored UAV 120 out of alignment with the guide 22. The control system 48 may operate the motor 44 until the empty compartment is aligned with the guide 22 as previously described.

The control system 48 may operate the lid to block access to the compartments 90 of the storage assembly 70.

Figure 9:
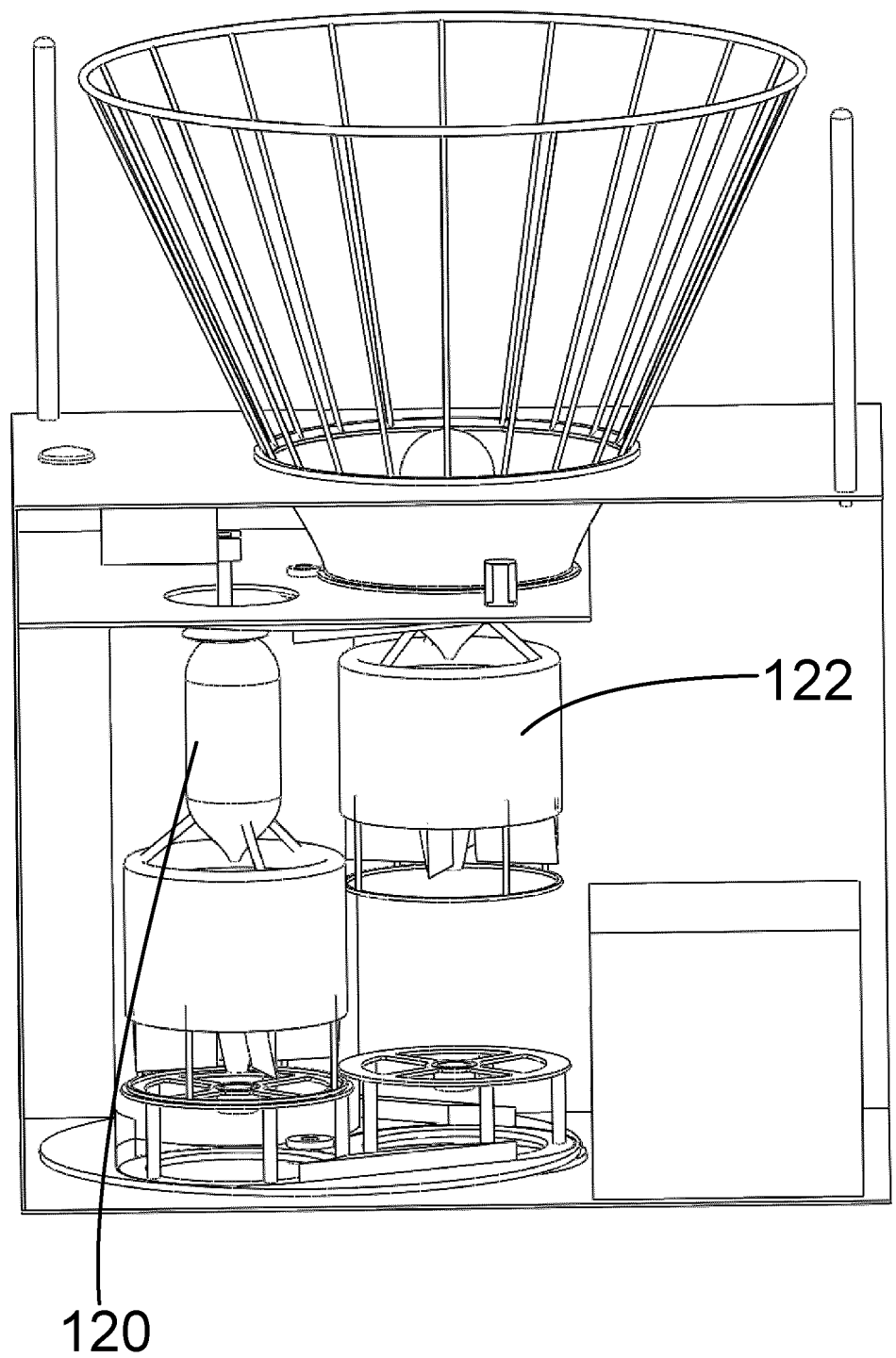
FIG. 9 is a perspective view of the docking station of FIG. 1 with external walls of the housing removed and two UAVs.

To access the payload system 50, the control system 48 then activates the motor 44 to rotate the storage assembly 70 by rotating the second end plate 76 via the rotor 46. As shown in FIG. 9, the storage assembly 70 rotates until the compartment 90 containing the UAV 120 is proximate the payload system 50.

To unload a payload from the UAV 120, the control system 48 sends a signal to the control unit 52 to initiate a payload unload. The control unit 52 sends a signal to the arm 54 to align the gripper 56 with the payload on the UAV 120. The control unit 52 activates the arm 54 to extend and the gripper 56 to affix to the payload on the UAV 120. The control unit 52 then actives the arm 54 to retract and the gripper removes the payload from the UAV 120. The control unit 52 then sends a signal to the arm to move the payload away from the UAV 120.

To attach a new payload to the UAV 120, the control system 48 sends a signal to the control unit 52 to affix a new payload to the UAV 120. The control unit 52 actives the arm 54 to extend and the gripper 56 to attach the new payload to the UAV 120. The control unit 52 then actives the arm 54 to retract and move away from the UAV 120.

While the UAV 120 is proximate the payload system 50, another UAV 122 may descend into another compartment as per the control methodology already described as shown in FIG. 9.

When a user wishes to deploy a UAV from a compartment 90 of the storage assembly 70, the control methodology described is simply reversed. If the empty compartment of the storage assembly 70 is positioned in alignment with the secondary opening 34 of the guide 22, the control system 48 activates the motor 44 to rotate the storage assembly 70 by rotating the second end plate 76 via the rotor 46 until the compartment 90 containing the UAV 120 is in alignment with the frustum 40. The control system 48 then sends a signal to the UAV 120 to activate the propulsion unit of the UAV 120. The UAV 120 then commences ascent out of the compartment 90. The UAV 120 ascends out of the compartment 90 through the frustum 40 and through the secondary opening 34 of the guide 22. The UAV 120 ascends through the guide 22 and out the main opening 30 of the guide 22. Once the UAV 120 is a certain vertical distance away from the docking station, the UAV 120 performs its predefined mission or holds its position and waits for commands from the operator.

Figure 10:
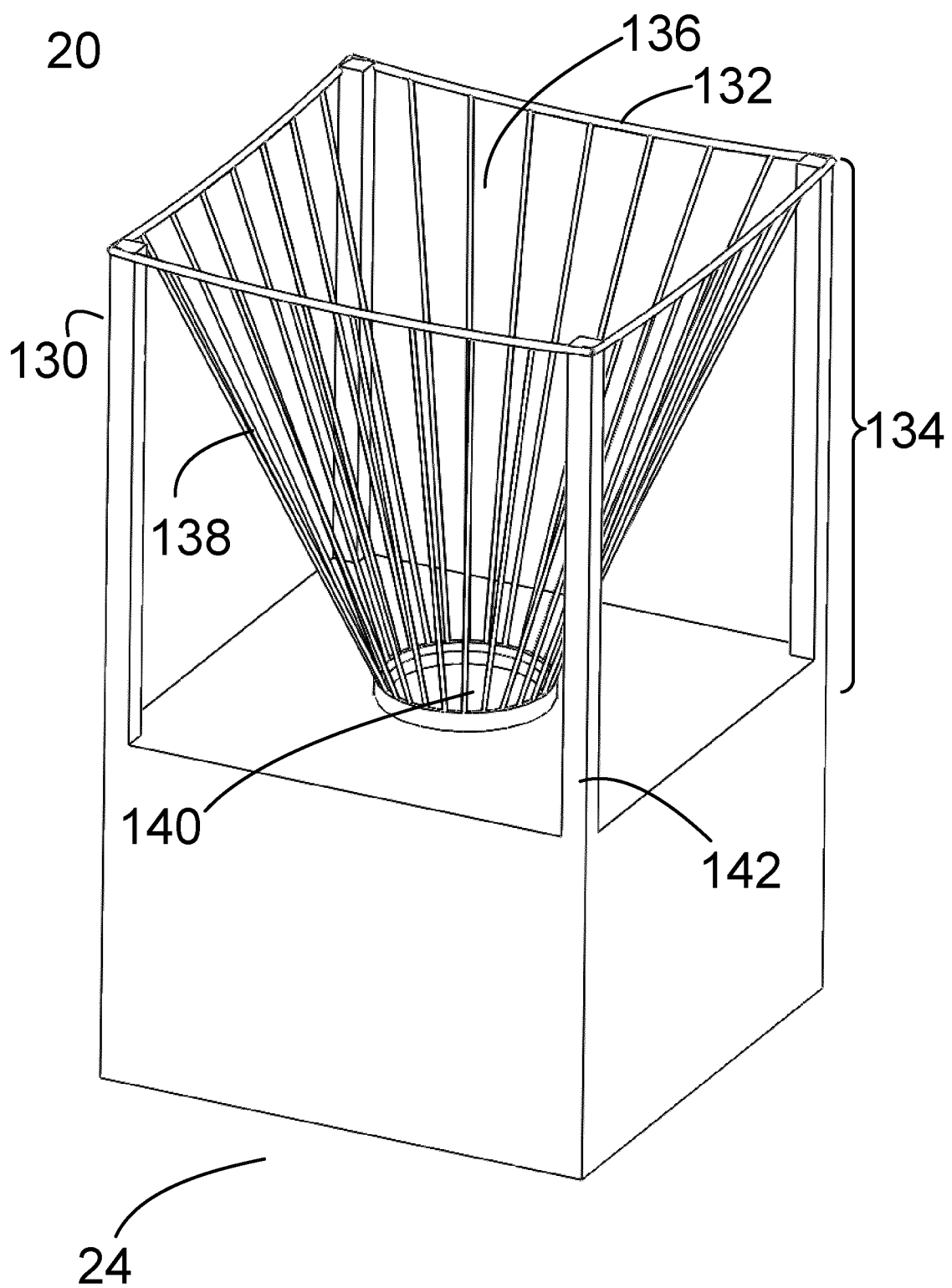
FIG. 10 is a perspective view of another embodiment of a docking station in accordance with an aspect of the disclosure.

While a particular guide 22 has been described, those of skill in the art will appreciate that other configurations are possible. In another embodiment, the docking station 20 comprises a guide 130 as shown in FIG. 10. The remaining elements of the docking station 20 are the same as the previously described embodiment and will not be described further. The guide 130 is configured to safely and reliably guide a ducted fan UAV into the housing 24. The guide 130 is coupled to the housing 24 such that a ducted fan UAV may descend through the guide 130 into the housing 24. The guide 130 comprises a rim 132 coupled to a body 134 which is coupled to the housing 24. The body 134 extends from the rim 132 to the housing 24. The rim 132 forms a main opening 136 which is sized to receive a ducted fan UAV. The rim 132 is generally square shaped. The body 134 comprises wires 138 extending from the housing 24 to the rim 132. The wires 138 are stiff. The body further comprises four posts 142 extending from the housing 24 to the each corner of the rim 132. The posts 142 support the rim 132. The guide 130 is communicatively coupled to the housing 24 via a secondary opening 140. The wires 32 extend diagonally between the housing 24 and the rum 132 such that the main opening 136 is larger than the secondary opening 140. The rim 132 is sized such that the main opening 136 is larger than the diameter of a ducted fan UAV. The secondary opening 140 is marginally larger than the diameter of a ducted fan UAV. The spacing between the wires 138 allows for air to blow between the wires 138. This reduces the disturbance causes by airflow on the body 134 thereby maintaining the general shape of the guide 130. The angle of the wires 138 relative the housing 24 of the docking station 20 ensures that a UAV that contacts the wires 138 does not get stuck on the wires 138, but rather descends through the secondary opening 140 as previously described.

Figure 11:
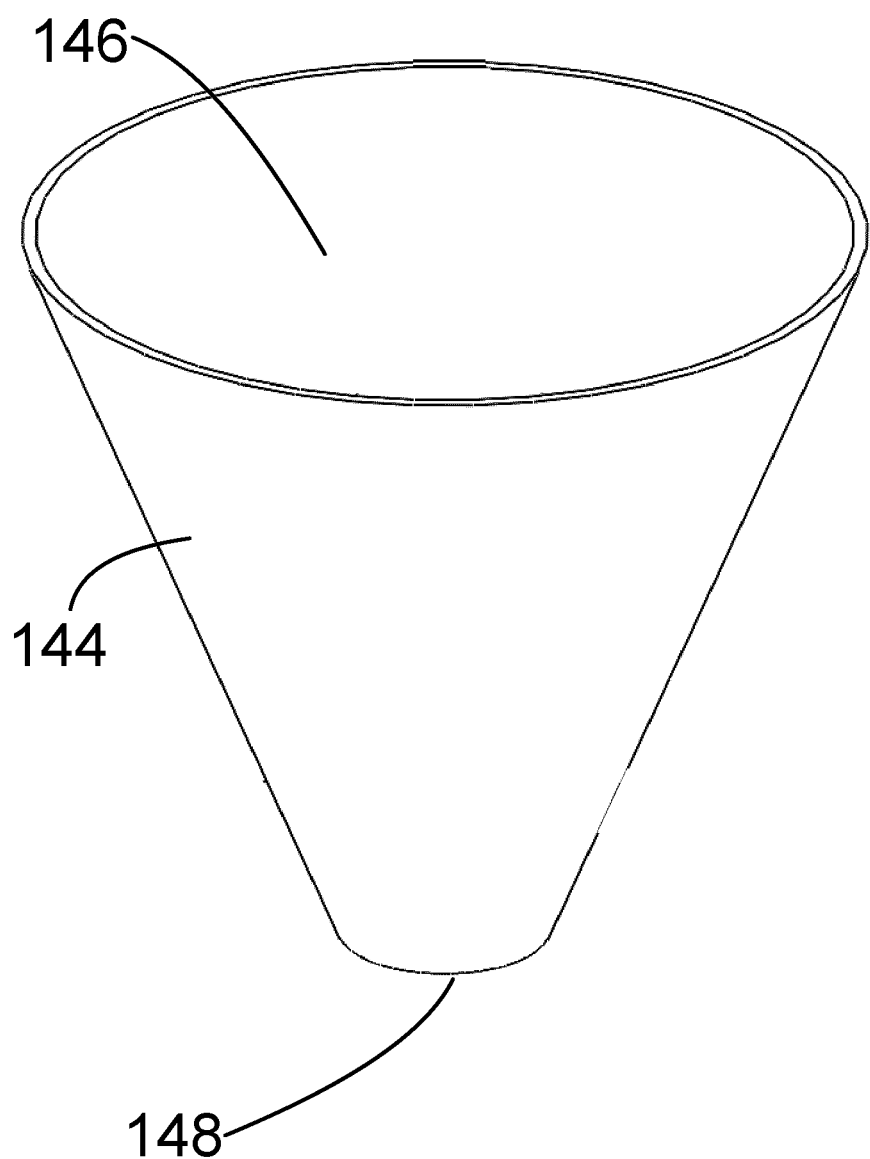
FIG. 11 is a perspective view of another embodiment of a guide for the docking station of FIG. 1.

While a particular guide 22 has been described, those of skill in the art will appreciate that other configurations are possible. In another embodiment, the docking station 20 comprises a guide as shown in FIG. 11. In this embodiment, the guide is a funnel 144. The funnel 144 is configured to safely and reliably guide a ducted fan UAV into the housing 24. The funnel 144 is hollow. The funnel 144 is rigid. The funnel 144 is configured to be coupled to the housing 24 such that a ducted fan UAV descends through the funnel 144 into the housing 24. The funnel 144 has a main opening 146 which is sized to receive a ducted fan UAV. The funnel 144 is communicatively coupled to the housing 24 via a secondary opening 148. The main opening 146 is larger than the secondary opening 148. The main opening 146 is larger than the diameter of a ducted fan UAV. The secondary opening 148 is marginally larger than the diameter of a ducted fan UAV. The angle of the stem of the funnel 144 is configured such that a UAV that contacts the wires 144 does not get stuck on the stem, but rather descends through the secondary opening 148 as previously described.

Figure 12:
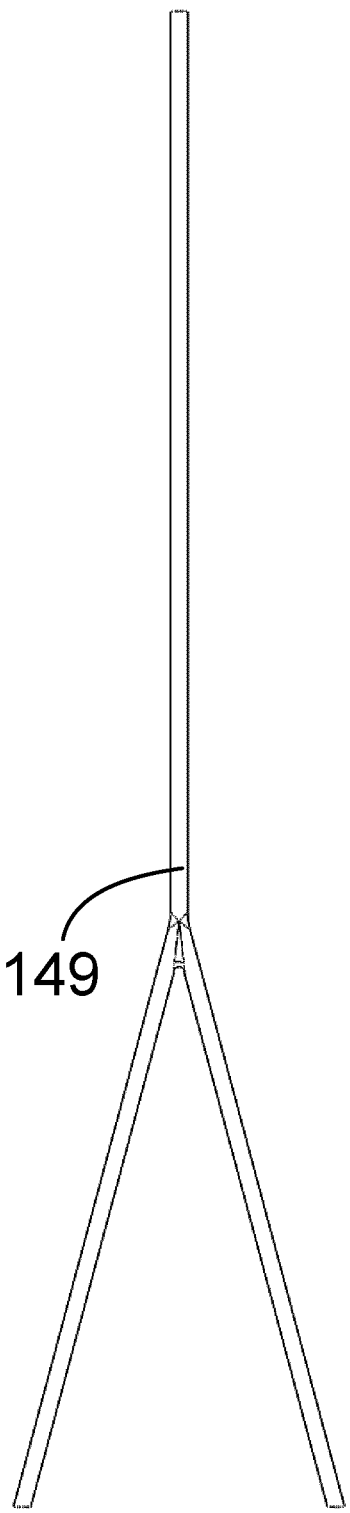
FIG. 12 is a front side view of another embodiment of a wire for the docking station of FIG. 1.

While particular wires 32 have been described, those of skill in the art will appreciate that other configurations are possible. In another embodiment, a guide 22 of the docking station 20 comprises Y-shaped wires 149 as shown in FIG. 12. The adjacent arms of each Y-shaped wire 149 are affixed to the housing 24 while the single arm of each Y-shaped wire 149 is affixed to the rim 26. The Y-shaped wire 149 increases the rigidity of the body 28 compared to the previously described wires 32. The Y-shape of the Y-shaped wire 149 increases the space for air to pass through between single arms of adjacent Y-shaped wires 149. Furthermore, since the Y-shaped wires 149 increase the rigidity of the body 28, the number of wires 149 required is reduced as compared to the previously described wires 32. Furthermore, maintaining the same number of Y-shaped wires 149 as the number wires 32 previously described permits the diameter of the rim 26 to be enlarged due the increased rigidity of the body 28 when using the Y-shaped wires 149.

While a particular charging system 42 has been described, those of skill in the art will appreciate that other configurations are possible. In another embodiment, the charging system 42 transfers power to a UAV via a physical wired connection to the UAV. Thus, the UAV is configured to receive the wired connection. The posts 96 of the dampening system 92 are therefore configured to receive a UAV within a compartment 90 of the storage assembly 70 and lower such that the UAV connects to the wired connection of the charging station 42. In this embodiment, the wired connection comprises contacts on the first end plate 74.

While a housing 24 comprising a charging system 42 has been described, those of skill in the art will appreciate that other configurations are possible. In another embodiment, the housing 24 comprises a fueling system configured to fuel a ducted fan UAV stored in a compartment 90 of the storage assembly 70. The fueling system contains liquid fuel such as gasoline. In this embodiment, the control system 48 controls fueling of a UAV that is stored in a compartment 90.

While particular posts 96 have been described, those of skill in the art will appreciate that other configurations are possible. In another embodiment, the posts 96 comprise spring material.

While a particular storage assembly 70 has been described, those of skill in the art will appreciate that other configurations are possible. In another embodiment, the storage assembly 70 comprises two compartments 90. In another embodiment, the storage assembly 70 comprises four or more compartments 90. In another embodiment, the storage assembly 70 comprises a single compartment 90.

While a particular storage assembly 70 has been described, those of skill in the art will appreciate that other configurations are possible. In another embodiment, each compartment 90 in the storage assembly 70 comprises a dampening system 92.

While a particular dampening system 92 has been described, those of skill in the art will appreciate that other configurations are possible. In another embodiment, each dampening system 92 does not comprise an IR light beacon. In this embodiment, the UAV uses the positioning information of its own GNSS and the correction data provided by the GNSS receiver 114 of the communication system of the docking station 20.

In use, the docking station 20 may be stationary or placing on a moving object. The docking station 20 may be placed on any kind of vehicle (marine, land or air based). In one application, the docking station 20 is placed on board an icebreaker. UAVs are deployed from the docking station 20 on the icebreaker and used for ice surveying. In another application, the docking station 20 is placed on board a vehicle of a vehicle convoy.

Figure 13:
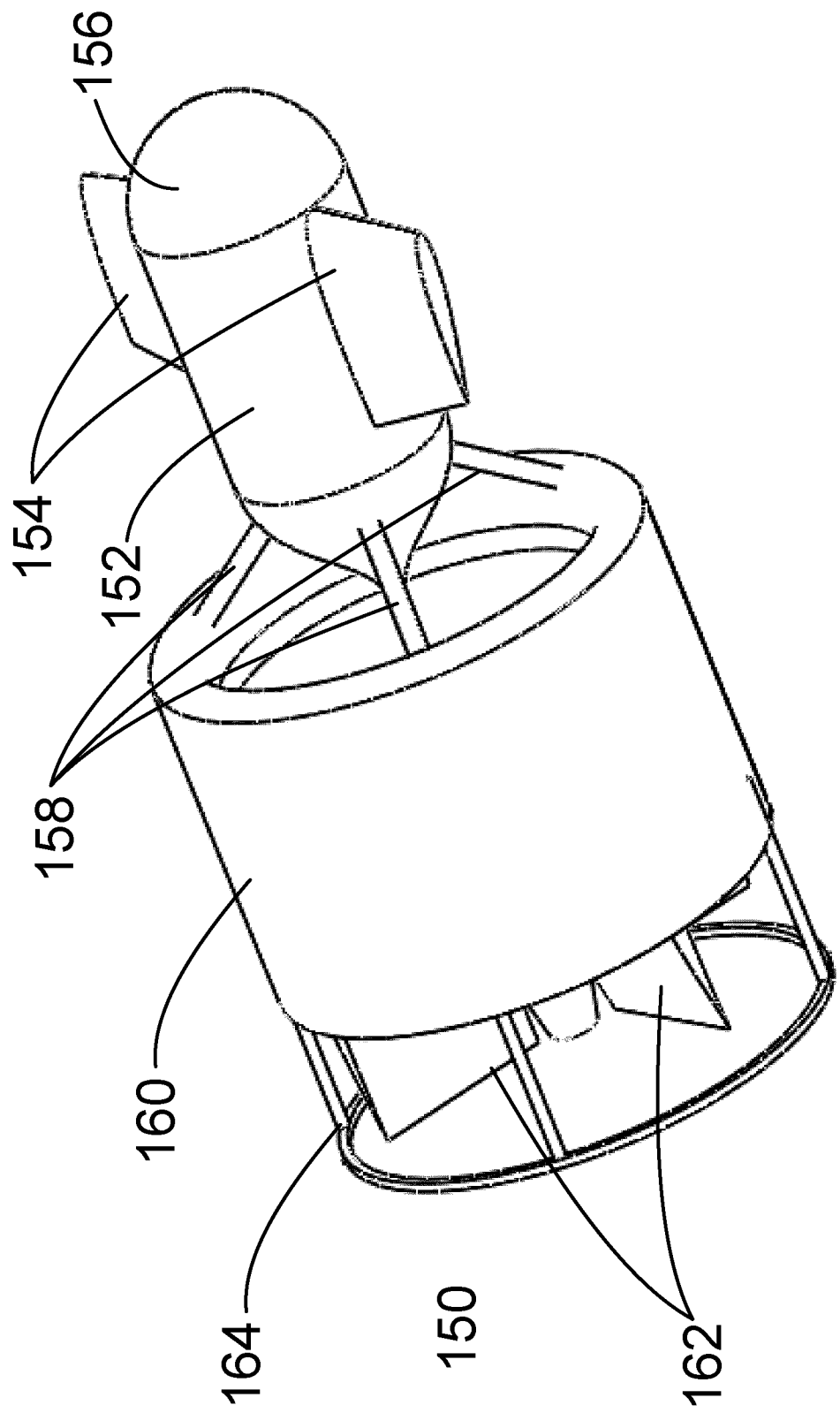
FIG. 13 is a perspective view of a ducted fan UAV in accordance with an aspect of the disclosure.
Figure 14:
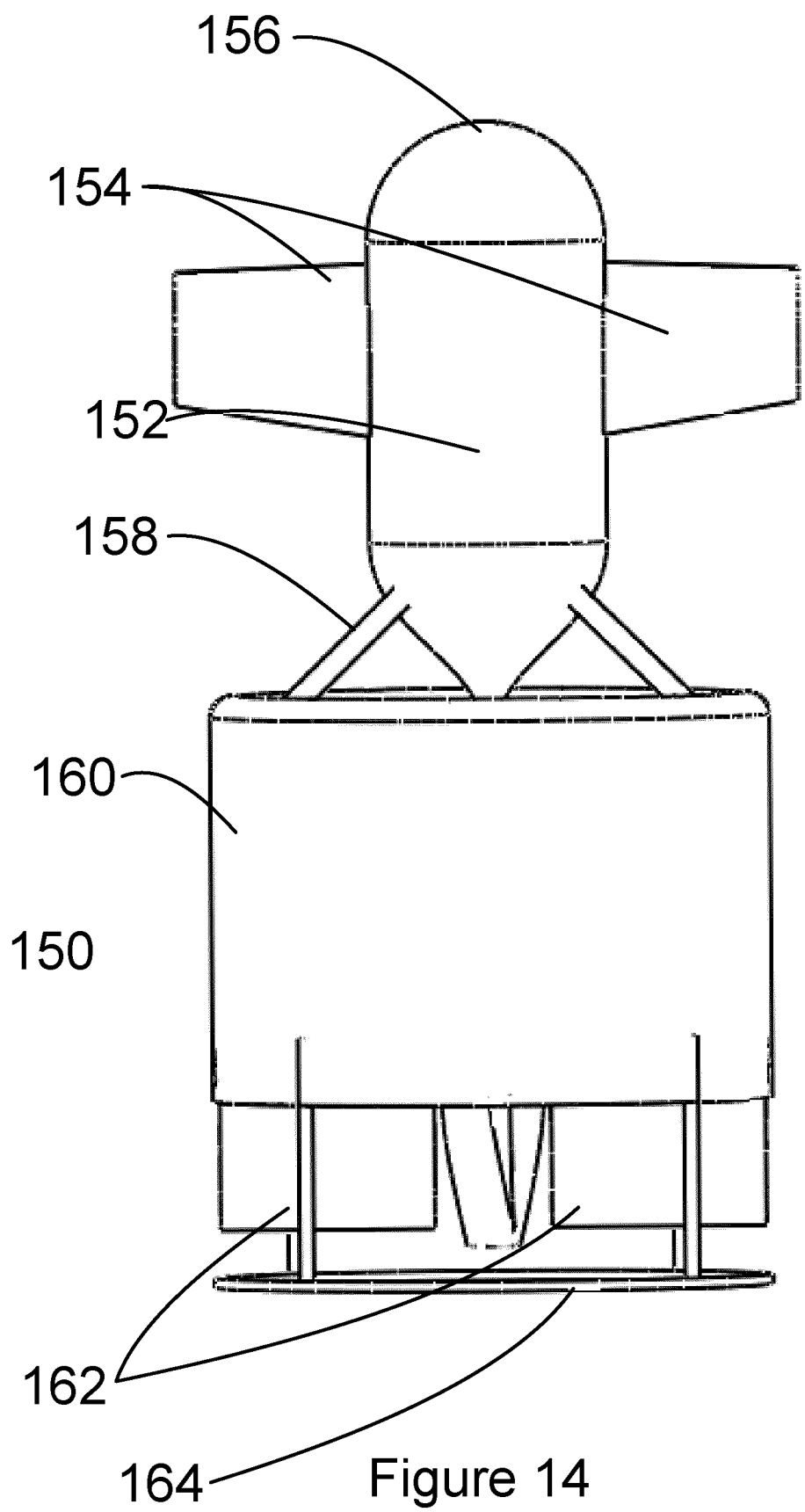
FIG. 14 is a front side elevation view of the ducted fan UAV of FIG. 13.
Figure 15:
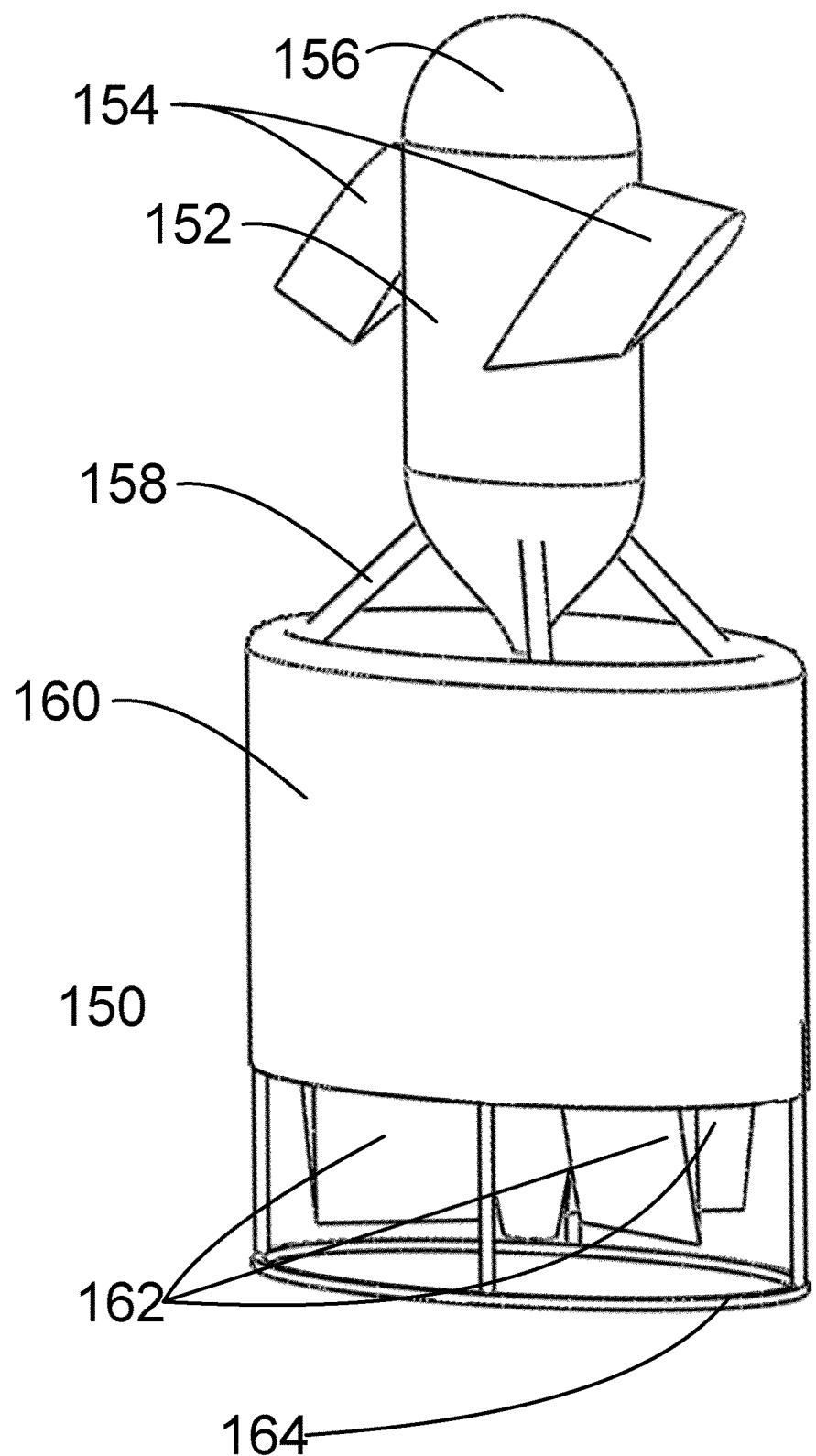
FIG. 15 is another perspective view of the ducted fan UAV of FIG. 13.

Turning now to FIGS. 13 to 15, a ducted fan UAV is shown and is generally identified by reference numeral 150. The UAV 150 comprises a fuselage 152 with two canards 154, a payload 156 affixed to one longitudinal end of the fuselage 152, and three support struts 158 connecting the other longitudinal end of the fuselage 152 to a duct 160. The fuselage 152 has a generally cylindrical shape. The payload 156 is dome shaped. The payload 156 is detachable from the fuselage 152. The payload 156 and/or fuselage 152 house sensors, a control system, a power system and/or other electronics. The support struts 158 are circumferentially equidistant about the fuselage 152. The support struts 158 are rigid to maintain the position of the fuselage 152 relative to the duct 160. While three support struts 158 are shown, those of skill in the art will appreciate that fewer or more may be used.

Within the duct 160 is a centrally mounted fan or propeller which provides lift and thrust to the UAV 150 as will be described. The duct 160 has a generally cylindrical shape. The duct 160 further comprises a plurality of guide vanes. Each guide vane is generally teardrop shaped. Each guide vanes comprises a fixed portion and a movable portion. The fixed portion is secured to the duct 160 and centered on the fan or propeller within the duct 160. The movable portion is approximately the final third of the teardrop shaped guide vane. The movable portion is referred to as a control vane 162. The control vanes 162 extend out from the duct 160 and are configured to control thrust and lift vectors. The control vanes 162 are configured to steer the thrust/lift in the desired direction to control the UAV. The control vanes 162 are circumferentially equidistant within the duct 160. There are four control vanes 162. The control vanes 162 are configured to cause attitude changes of the UAV 150 during flight. The attitude changes comprise pitching, rolling and yawing of the UAV 150 during flight.

A stand 164 is affixed to the cylindrical periphery of the duct 160 opposite the fuselage 152. The stand 164 has four arms, each connected at one end to the cylindrical periphery of the duct 160 and at another end to a ring. The stand 164 is configured to support the UAV 150 in a vertically standing resting position as shown in FIG. 15. Although four control vanes 162 are described, those of skill in the art will appreciate that more or fewer may be used. In another embodiment, there are three control vanes 162.

Each canard 154 has a generally teardrop shape. Each canard 154 is symmetrical. The canards 154 are generally similarly shaped. The canards 154 extend from the fuselage 152. The canards 154 are oriented in opposed positions on the fuselage 152. The canards 154 are generally opposite each other relative to central longitudinal axis of the fuselage 152. The canards 154 are rotatably mounted to the fuselage 152. The canards 154 extend away from the fuselage 152. The canards 154 minimally extend past the duct 160 in diameter.

Figure 16A:
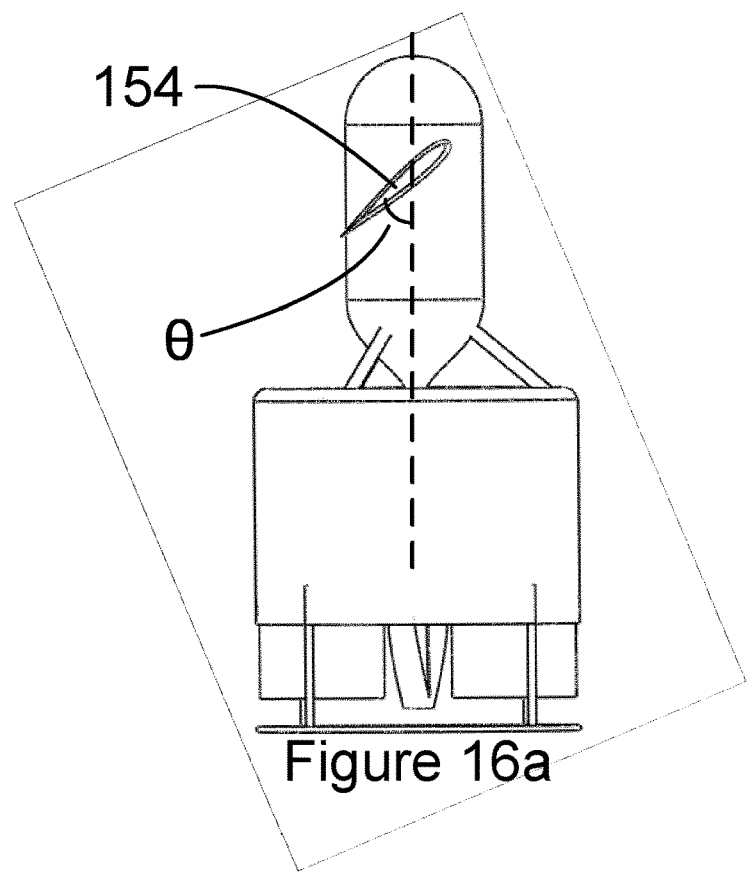
FIG. 16a is a left side elevation view of the ducted fan UAV of FIG. 13.
Figure 16B:
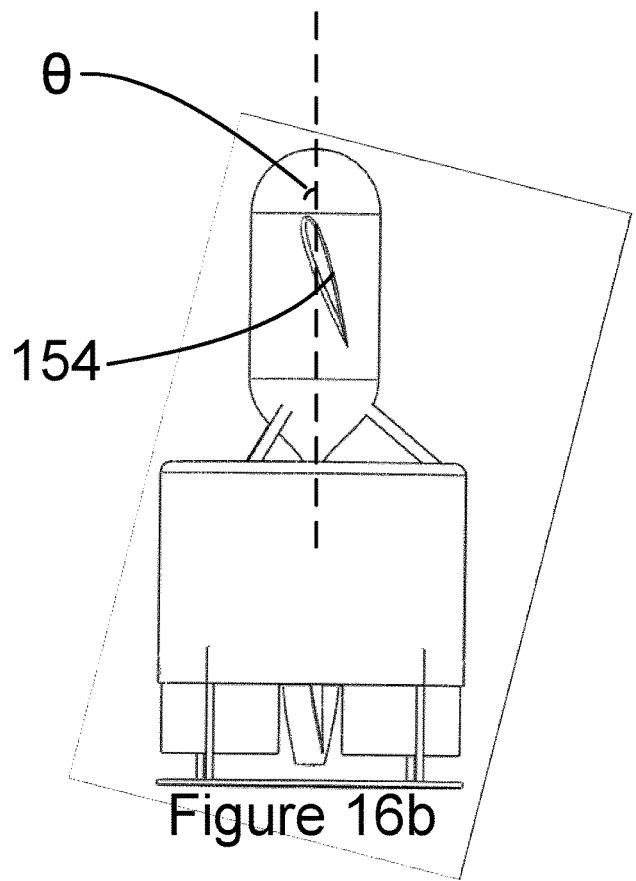
FIG. 16b is another left side elevation view of the ducted fan UAV of FIG. 13.

As shown in FIGS. 16a and 16b, each canard 154 is configured to rotate to alter the angle of attack of the canards 154. In general, the angle of attack is the angle between the direction of the oncoming air and the angle of the chord of an airfoil.

Each canard 154 is configured to rotate relative to the central longitudinal axis of the ducted fan UAV 150. The central longitudinal axis of the ducted UAV 150 is shown in dashed lines. Each canard 154 is configured to rotate to an angle of rotation (θ) from the central longitudinal axis. In this embodiment, the angle of rotation (θ) ranges from approximately −60° from the central longitudinal axis as shown in FIG. 16a to approximately +10° from central longitudinal axis as shown in FIG. 16b. Thus, each canard 154 can rotate through a range of −60° to +10° from the central longitudinal axis. When the angle of rotation (θ) is 0°, the canards 154 are in vertical positions. In the vertical positions, the canards 154 are generally coplanar with the central longitudinal axis of the UAV 150. The canards 154 rotate through the range −60° to +10° from the central longitudinal axis in order to prevent a stall condition and loss of control of the UAV 150 as will be described. Stalling is defined as flow separation during flight caused by a high angle of attack.

In another embodiment, the angle of rotation of the canards (θ) ranges from approximately −60° from the central longitudinal axis to approximately +60° from the central longitudinal axis.

In another embodiment, the canards 154 do not extend past the diameter of the duct 160. In this embodiment, the span from one canard 154 to the other canard 154 is less than or equal to the diameter of the duct 160.

Figure 17:
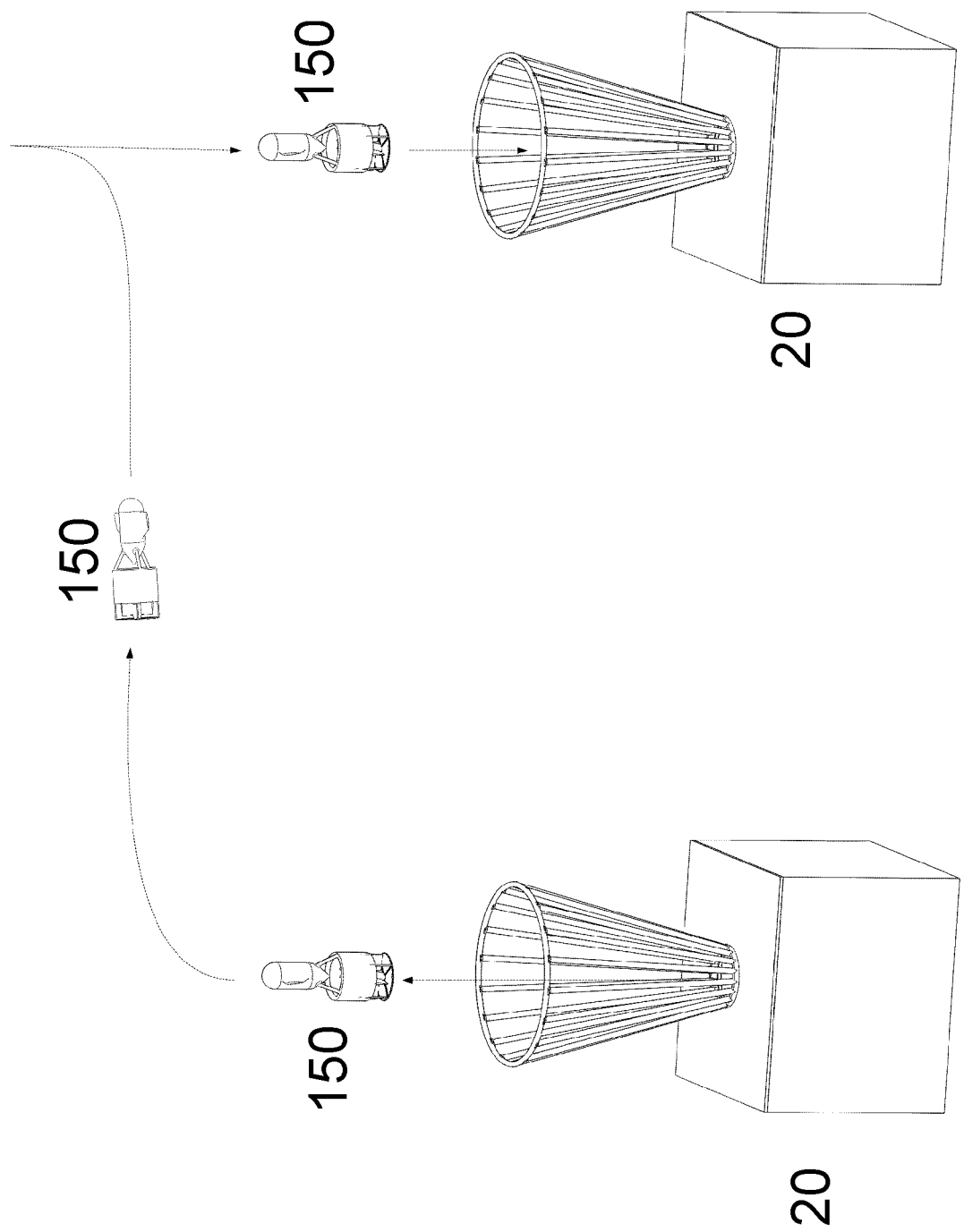
FIG. 17 is a perspective view of the ducted fan UAV of FIG. 13 in use.

Turning now to FIG. 17, operation of the ducted fan UAV 150 with a docking station is shown. In this embodiment, the docking station is the previously described docking station 20. As previously described, the UAV 150 is stored with a compartment 90 of the storage assembly 70 of the docking station 20. The UAV 150 ascends out of the compartment 90 and through the guide 22 of the docking station 20. The UAV 150 ascends through rotation of the fan in the duct 160 which provides lift. During this ascent, the canards 154 are in the vertical positions. The ascent of the UAV 150 out from the compartment 90 and above the docking station 150 is shown on one side of the FIG. 17 and indicated with a vertical arrow pointing away from the docking station 20. During vertical ascension, the UAV 150 is in a vertical flight orientation. In the vertical flight orientation, the UAV 150 is generally vertical. When the UAV 150 is generally vertical, the longitudinal central axis of the UAV 150 is generally perpendicular to the earth's surface.

Once the UAV 150 has ascended to a predefined safe altitude from the docking station 20, the UAV 150 enters a first transition phase. In the first transition phase, the angle of rotation (θ) of the canards 154 decreases to −60° as shown in FIG. 16a. Thrust vectoring of the control vanes 162 then induces horizontal pitching of the UAV 150. This causes the horizontal velocity of the UAV 150 to increase. As the UAV 150 is now at an angle between generally vertical and generally horizontal, relative to the earth's surface, insufficient or negative lift and increasing drag of the canards 154 may result in stalling of the UAV 150. The angle of rotation (θ) of the canards 154 is therefore increased from −60° continuously as the UAV 150 horizontal pitches to reduce drag and/or increase lift. The reduced drag and/or increased lift caused by the rotating canards 150 prevent stalling of the UAV 150. The fan in the duct 160 continues to provide lift, however, lift is now also provided by the canards 154. The UAV 150 rotates until the UAV 150 reaches a horizontal flight orientation. In the horizontal flight orientation, the UAV 150 is generally horizontal. When the UAV 150 is generally horizontal, the longitudinal central axis of the UAV 150 is generally coplanar with the earth's surface.

In the horizontal flight orientation the entire UAV 150, in particular the duct 160, acts as a wing. The duct 160 and the canards 154 provide sufficient lift for horizontal flight of the UAV 150. In the horizontal flight orientation, the UAV 150 has a slightly positive pitch angle between the central longitudinal axis of the UAV 150 and the earth's surface. In this embodiment, the positive pitch angle is between 0° and 15°. As the UAV 150 reaches the horizontal flight orientation, the angle of rotation (θ) of the canards 154 increases from −60° to an angle between −10° and +10°. In the horizontal flight orientation, the angle of rotation (θ) of the canards 154 is set such that the UAV 150 is in a stable and controllable horizontal flight. The precise angle of rotation (θ) depends generally on the weight, weight distribution and velocity of the UAV 150. As will be appreciated, the angle of rotation (θ) of the canards 154 transitions from 0° to −60° and then to somewhere between −10° and +10° in a continuous manner. The angle of rotation (θ) of the canards 154 is constantly adjusted to reduce drag and increase lift of the UAV 150 in an acceptable range during the transition from the vertical flight orientation to the horizontal flight orientation.

The fan in the duct 160 of the UAV 150 now provides generally horizontal thrust as shown in the central portion of FIG. 17. In the horizontal flight orientation, the fan has to mostly only overcome air resistance and is therefore more efficient than in the vertical flight phase. The necessary lift of the UAV 150 is mostly provided by the duct which acts as a circular wing and the canards 154. This reduces the power consumption of the UAV 150 thereby increasing the range of travel of the UAV 150. Furthermore, the UAV 150 can reach higher speeds during the horizontal flight orientation as compared to the vertical flight orientation.

Rotation of the canards 154 allows for control of the pitch of the UAV 150 in the horizontal flight orientation without using the controls vanes 162. Rotation of the canards 154 may be autonomously controlled by onboard systems on the UAV 150. Rotation of each canard 154 may be independently controlled to allow control of the roll and pitch of the UAV 150 without using the control vanes 162.

Once the UAV 150 has completed its mission, requires a recharge and/or requires a different payload, the UAV 150 returns to a vertical position above the docking station 20. The canards 154 rotate to alter the angle of attack of the canards 154 and cause a slight rotation towards the vertical orientation of the UAV 150. Thrust vectoring of the control vanes 162 then induces vertical pitching of the UAV 150. This causes the horizontal velocity of the UAV 150 to decrease. As the UAV 150 is now at an angle between generally vertical and generally horizontal, relative to the earth's surface, insufficient or negative lift may result in stalling of the UAV 150. The angle of rotation ($\theta$) of the canards 154 is therefore decreased from an angle between $-10°$ and $+10°$ continuously as the UAV 150 vertically pitches to increase lift. The increased lift caused by the rotating canards 150 may prevent stalling of the UAV 150. The UAV 150 rotates until the UAV 150 reaches the vertical flight orientation. As previously stated, in the vertical flight orientation, the UAV 150 is generally vertical. When the UAV 150 reaches the vertical flight orientation, the canards 154 rotate back to the vertical positions. The fan in the duct 160 of the UAV 150 now provides generally vertical thrust. The transition from the horizontal to vertical orientation of the UAV 150 is not as critical as the transition from the vertical to horizontal orientation of the UAV 150 since a reduction of speed may be much faster than acceleration. In another embodiment, a transition from the horizontal to vertical orientation of the UAV 150 is achieved without rotation of the canards 150.

The UAV 150 then descends into the docking station 20 as shown by the vertical arrow pointing toward the docking station 20 in FIG. 17. The UAV 150 enters a compartment 90 of the storage assembly 70 of the docking station 20 as previously described.

While operation of the canards 154 has been shown as part of the transition the UAV 150 between the vertical orientation and the horizontal orientation, those of skill in the art will appreciate that other modes of operation are possible. In another embodiment, the control vanes 162 are used to alter thrust vectoring during the first and second transition phases without any rotation of the canards 154. In this embodiment, the canards 154 are fixed at an angle between $-10°$ and $+10°$ from the central longitudinal axis of the UAV 150. Only the control vanes 162 are used to transition the UAV 150 from the vertical orientation to the horizontal orientation. In the horizontal orientation, the fixed angle of the canards 154 provides adequate lift to maintain altitude. The specific fixed angle of the canards 154 depends on the design speed of the UAV 150. Only the control vanes 162 are used to transition the UAV 150 from the horizontal orientation to the vertical orientation. In this embodiment, during the first and second transition phases the lift provided by the fan together with the lift of the duct 160 and canards 154 may not be sufficient to keep the UAV 150 in the air. Depending on the vertical altitude of the UAV 150 prior to entering the first and second transition phases, a loss of altitude may be acceptable. However, if a loss of altitude is not acceptable, a loss of altitude can be avoided by using a ballistic transition with no or minimal lift of the canards 154 and duct 160. This is only possible if sufficient height is available to conduct a ballistic transition maneuver. In a ballistic transition, the UAV 150 accelerates vertically to the design speed of the UAV 150. The control vanes 162 then orient the UAV 150 in the horizontal orientation during or after the acceleration to the design speed.

While a particular UAV 150 has been described, those of skill in the art will appreciate that other configurations are possible. In another embodiment, the UAV 150 comprises a servo motor configured to adjust the angle of attack of the canards 154. The servo motor is configured to alter the angle of attack of the canards 154 by rotating the canards 154 about their pivot axes relative to the fuselage 152.

The pivot axis of each canard 154 is located roughly near the t/4-line. The t-4 line is approximately one quarter from the end of the canard 154 proximate the payload 156. The location of the pivot axis ensures that the loads to actuate each canard 154 are minimized. Both canards 154 are actuated by the same servo motor. In another embodiment, each canard 154 is actuated by a separate servo motor. Two separately actuated canards 154 with two separate servo motors allow for a degree of redundancy. Furthermore, two separately actuated canards 154 with two separate servo motors allow for full control of the UAV 150 in the horizontal flight phase without using the control vanes 162.

While canards 154 having a teardrop shape have been described, those of skill in the art will appreciate that other configurations are possible. In another embodiment, the canards 154 are non-teardrop shaped. In another embodiment, the canards 154 are asymmetrically shaped. Due to the usually higher lift coefficients and bigger range of angle of attack asymmetrical canards 154 ensure that the canards 154 are smaller than canards 154 with a symmetrical shape. In another embodiment, the outline of the canards 154 is rectangular or trapezoidal. In another embodiment, each canard 154 is designed as a delta wing. Canards 154 designed as delta wings have an increased usable angle of attack range and an increased lift at a high angle of attack compared to the rectangular or trapezoidal outlined canards 154 described. In another embodiment, the trailing edge of either one or both of the canards 154 is modified in an angle and/or rounded on the tip to allow the UAV 150 to enter the compartment 90 of the storage assembly 70 of the docking station 20 with a reduced risk of damage to the canards 154.

Although embodiments have been described above with reference to the figures, those of skill in the art will appreciate that variations and modifications may be made without departing from the scope thereof as defined by the appended claims.

What is claimed is:

1. A ducted fan unmanned aerial vehicle (UAV) docking station comprising:
   a guide sized to receive a ducted fan UAV, wherein the guide comprises a rim forming a main opening sized to receive a ducted fan UAV, the rim supported by a plurality of rigid wires extending between the rim and a housing; and
   the housing communicatively coupled to the guide, the housing accessible from the guide via a secondary opening, the housing comprising:
      a storage assembly comprising:
         at least one compartment sized to store the UAV; and
         at least one dampening system coupled to the at least one storage compartment for cushioning the UAV.

2. The docking station of claim 1, wherein the housing further comprises a charging system configured to charge the UAV.

3. The docking station of claim 1, wherein the housing further comprises a fueling system configured to fuel the UAV.

4. The docking station of claim 1, wherein the dampening system comprises a plate sized to support the UAV and a plurality of arms supporting the plate.

5. The docking station of claim 1, wherein the compartment comprises a cylinder.

6. The docking station of claim 1, further comprising a lid coupled at least one compartment for covering the at least one compartment.

7. The docking station of claim 1, wherein the storage assembly further comprises an infrared light beacon for guiding the UAV through the guide and into the compartment.

8. The docking station of claim 1, wherein the rim is supported by a plurality of posts.

9. The docking station of claim 1, further comprising a communication system configured to communicate with the ducted fan UAV.

10. The docking station of claim 9, wherein the communication system is further configured to communicate with an operator of the UAV.

11. The docking station of claim 9, wherein the communication system further comprises a global navigation satellite system (GNSS) receiver with real time kinematic (RTK) base station capability.

12. The docking station of claim 11, wherein the GNSS receiver provides RTK correction data.

13. The docking station of claim 1, wherein the storage assembly comprises three adjacent compartments.

14. The docking station of claim 13, wherein the storage assembly comprises two dampening systems, each dampening system located within a respective compartment.

15. The docking station of claim 1, wherein the storage assembly is revolvable such that the compartment can be accessed via the guide during revolution of the storage assembly.

16. The docking station of claim 15, wherein the housing further comprises a motor for revolving the storage assembly.

* * * * *